United States Patent
Adachi et al.

(10) Patent No.: US 9,511,286 B2
(45) Date of Patent: *Dec. 6, 2016

(54) INFORMATION PROCESSING APPARATUS, COMPUTER-READABLE STORAGE MEDIUM HAVING INFORMATION PROCESSING PROGRAM STORED THEREIN, INFORMATION PROCESSING METHOD, AND INFORMATION PROCESSING SYSTEM

(71) Applicant: NINTENDO CO. LTD., Kyoto (JP)

(72) Inventors: Hiroaki Adachi, Kyoto (JP); Masahiro Shoji, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 91 days.

This patent is subject to a terminal disclaimer.

(21) Appl. No.: 14/321,062

(22) Filed: Jul. 1, 2014

(65) Prior Publication Data

US 2014/0315493 A1 Oct. 23, 2014

Related U.S. Application Data

(63) Continuation of application No. 13/102,490, filed on May 6, 2011, now Pat. No. 8,843,640.

(30) Foreign Application Priority Data

Feb. 25, 2011 (JP) ................................. 2011-040830

(51) Int. Cl.
*G06F 15/16* (2006.01)
*A63F 13/327* (2014.01)
(Continued)

(52) U.S. Cl.
CPC ............. *A63F 13/327* (2014.09); *A63F 13/12* (2013.01); *H04W 4/008* (2013.01); *H04W 8/005* (2013.01);
(Continued)

(58) Field of Classification Search
CPC ..... H04W 8/16; H04W 4/008; H04W 8/005; A63F 13/12; A63F 13/327
USPC .......................................................... 709/227
See application file for complete search history.

(56) References Cited

U.S. PATENT DOCUMENTS 7,620,027 B2 11/2009 Igarashi et al.
7,856,373 B2 12/2010 Ullah
(Continued)

FOREIGN PATENT DOCUMENTS

EP 1 241 838 9/2002
JP 2005-333378 12/2005
(Continued)

OTHER PUBLICATIONS

Shinya Saeki, ""Nintendo 3DS" has been launched, touchstone for popularity of 3D compatible machines" Nikkei Electronics, No. 1043, Japan, Nikkei Business Publications, Inc., Nov. 15, 2010, pp. 51-56.

(Continued)

*Primary Examiner* — Kristie Shingles
(74) *Attorney, Agent, or Firm* — Nixon & Vanderhye P.C.

(57) ABSTRACT

A search for another information processing apparatus and an access point is performed. When a result of the search is the other portable information processing apparatus, a process of performing data communication with the other information processing apparatus is performed. On the other hand, when the result of the search is the access point, a process of performing data communication via the access point is performed.

20 Claims, 21 Drawing Sheets

(51) Int. Cl.
   *H04W 8/00*      (2009.01)
   *H04W 48/16*     (2009.01)
   *H04W 88/06*     (2009.01)
   *H04W 4/00*      (2009.01)
   *A63F 13/30*     (2014.01)
   *H04W 84/18*     (2009.01)

(52) U.S. Cl.
   CPC ............ *H04W 48/16* (2013.01); *H04W 88/06* (2013.01); *A63F 2300/405* (2013.01); *A63F 2300/406* (2013.01); *A63F 2300/408* (2013.01); *H04W 84/18* (2013.01)

(56) References Cited

U.S. PATENT DOCUMENTS

| | | |
|---|---|---|
| 8,099,097 B2 | 1/2012 | Miyata |
| 8,433,375 B2 | 4/2013 | Yamazaki et al. |
| 8,843,640 B2* | 9/2014 | Adachi ............... A63F 13/12 709/227 |
| 2004/0259642 A1 | 12/2004 | Tanaka et al. |
| 2008/0182615 A1 | 7/2008 | Xue et al. |
| 2011/0205953 A1 | 8/2011 | Kuwahara |
| 2011/0306294 A1 | 12/2011 | Yamazaki et al. |
| 2012/0021703 A1 | 1/2012 | Yamazaki et al. |

FOREIGN PATENT DOCUMENTS

| | | |
|---|---|---|
| JP | 2007-175508 | 7/2007 |
| JP | 2008-42913 | 2/2008 |
| JP | 4073885 | 2/2008 |
| JP | 2009-081739 | 4/2009 |
| JP | 2010-218525 | 9/2010 |
| WO | WO 2004/098128 | 11/2004 |

OTHER PUBLICATIONS

Partial European Search Resort issued in App. No. 11164944.8 dated Sep. 27, 2016.

* cited by examiner

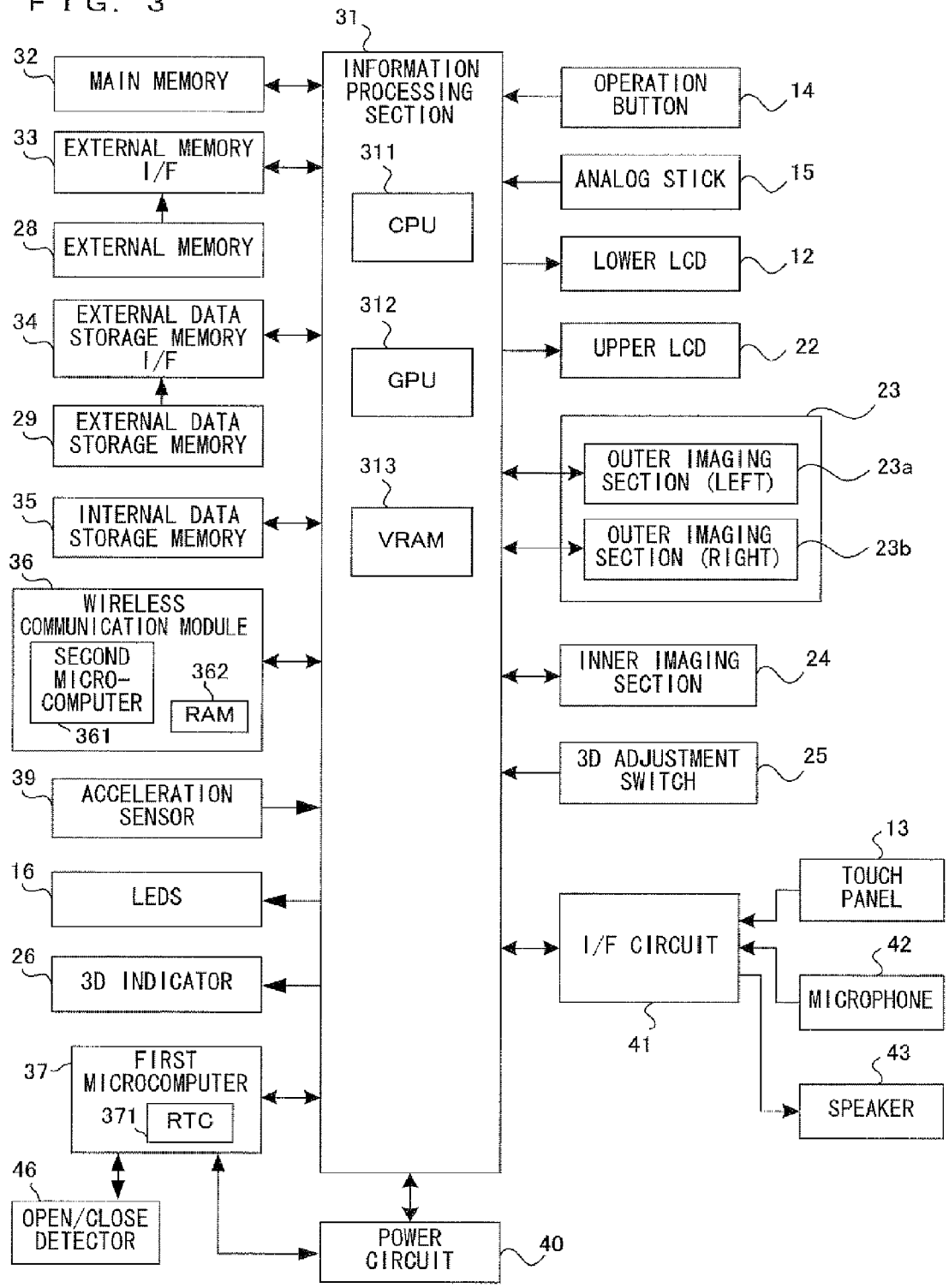

F I G. 6 A
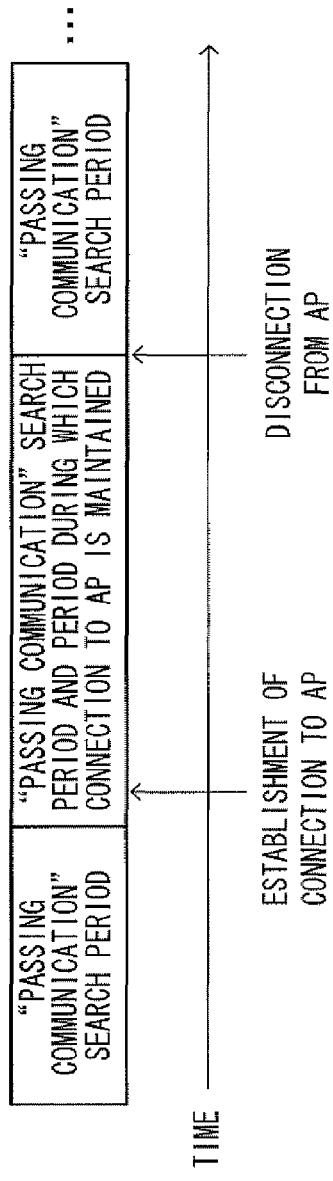
F I G. 6 B
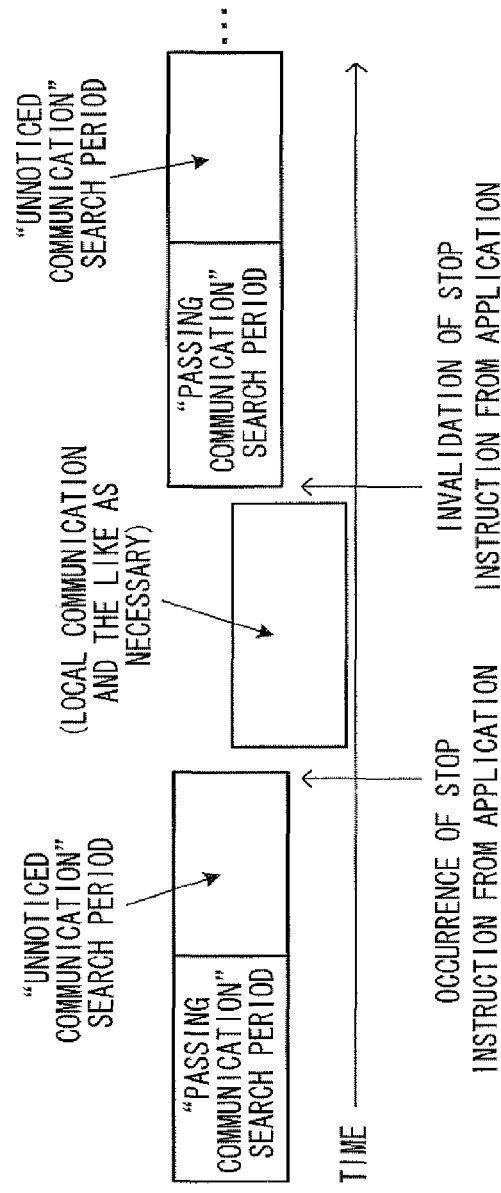

INFORMATION PROCESSING APPARATUS, COMPUTER-READABLE STORAGE MEDIUM HAVING INFORMATION PROCESSING PROGRAM STORED THEREIN, INFORMATION PROCESSING METHOD, AND INFORMATION PROCESSING SYSTEM

CROSS-REFERENCE TO RELATED APPLICATIONS

This is a continuation of copending parent application Ser. No. 13/102,490 filed May 6, 2011, which claims priority under 35 U.S.C. §119 based on Japanese Patent Application No. 2011-040830 filed Feb. 25, 2011, the entire contents of both of which are hereby incorporated by reference.

BACKGROUND

1. Technical Field

The technology presented herein relates to an information processing apparatus, and more particularly, relates to control of a communication process using short-distance wireless communication.

2. Description of the Background Art

Conventionally, a system is known in which communication is automatically performed with another apparatus. For example, Japanese Patent No. 4073885 discloses a system in which game apparatuses perform communication with each other to confirm exchange conditions of data, and exchange game data designated for exchange when the exchange conditions agree with each other.

However, in Japanese Patent No. 4073885, communication is merely automatically performed with another game apparatus, and the communication is only one type.

SUMMARY

Therefore, a main feature of the technology presented herein is to provide a novel information processing apparatus, a novel computer-readable storage medium having an information processing program stored therein, a novel information processing method, and a novel information processing system.

Further, another feature of the technology presented herein is to provide an information processing apparatus, a computer-readable storage medium having an information processing program stored therein, an information processing method, and an information processing system, which can automatically and selectively perform two types of communications, communication performed by connecting directly to another information processing apparatus and communication performed via an access point.

The present technology has the following features to attain the above.

An information processing apparatus according to the present technology comprises search means, first communication process means, and second communication process means. The search means automatically performs a search for another information processing apparatus and a predetermined access point by using short-distance wireless communication. The first communication process means automatically performs data communication with the other information processing apparatus found by the search means. The second communication process means automatically performs data communication via the access point found by the search means.

By the above configuration, the two types of communication modes, the communication mode performed directly with the other information processing apparatus (e.g., ad hoc communication) and the communication mode via the access point (e.g., infrastructure communication), can be selectively used in accordance with the situation. In particular, in a portable information processing apparatus in which the number of communication modes performed at the same time is only one and the communication is short-distant communication such as via a wireless LAN, a plurality of communication processes can be selectively used as appropriate.

In another configuration example, the information processing apparatus may further comprises search result determination means for determining whether or not a result of the search by the search means is the other information processing apparatus or the predetermined access point; and communication process control means for switching a communication process to be performed between a communication process performed by the first communication process means and a communication process performed by the second communication process means, in accordance with a result of the determination by the search result determination means.

According to the above configuration example, the two types of communication modes can be selectively used on the basis of a result of searching the surrounding of the information processing apparatus, and thus can be selectively used more efficiently.

In another configuration example, the search means may comprise search switch means for automatically switching between a first search and a second search; first search means for automatically performing a search for the other information processing apparatus when the search switch means switches to the first search; and second search means for automatically performing a search for the predetermined access point when the search switch means switches to the second search.

According to the above configuration example, the two types of communications, the communication performed with the other information processing apparatus and the communication via the access point, are selectively performed, and thus various communications can be performed without making the user aware of it. In addition, communication with a target present nearby and communication with a target present at a distant place can be seamlessly performed.

In still another configuration example, the search switch means may switch between the first search and the second search each time a predetermined time elapses.

According to the above configuration example, the two types of communications can be selectively performed with a low processing load.

In still another configuration example, the predetermined time may be a first unit time after the search switch means switches to the first search, and may be a second unit time shorter than the first unit time after the search switch means switches to the second search.

According to the above configuration example, while an opportunity of performing communication with a target present near the information processing apparatus is increased, communication can be also performed with a target at a place distant from the information processing apparatus.

In still another configuration example, the search means may perform the search such that a ratio of performing a search for the predetermined access point is higher than a ratio of performing a search for the other information processing apparatus.

According to the above configuration example, an opportunity of performing communication with a target present near the information processing apparatus is increased, and thus enjoyment of carrying the information processing apparatus can be provided to the user. Meanwhile, communication can be also performed with a target at a distant place in moderation. Thus, with regard to the two types of communications, the possibility of performing each communication (the possibility that a communicable partner is present) and the frequency of occurrence of each communication can be balanced with each other.

In still another configuration example, the information processing apparatus may further comprise use state change means for changing a state of the information processing apparatus between an unused state and a used state, the second communication process means may comprise connection means for connecting to the access point when it is determined that the access point is found, and the connection means may cut a connection to the access point after data communication via the access point ends, when the information processing apparatus is in the unused state; and may maintain the connection to the access point even after the data communication via the access point ends, when the information processing apparatus is in the used state.

According to the above configuration example, communication suitable for the used state of the information processing apparatus can be performed. For example, communication for browsing Internet sites is performed via the access point, and such communication is based on an operation of the user. Thus, in the used state, the Internet communication via the access point can be preferentially performed, and in the unused state, communication with another user can be preferentially performed without making the user notice it.

In still another configuration example, in the unused state of the information processing apparatus, the search switch means may switch to the first search when the connection to the access point is cut by the connection means.

According to the above configuration example, in the unused state, an opportunity of performing communication with a target present nearby can be increased, and, for example, a process of exchanging data and the like can be performed with the other information processing apparatus without making the user notice it.

In still another configuration example, in the used state of the information processing apparatus, the search switch means may switch to the first search when communication with the access point becomes disenabled after the information processing apparatus is connected to the access point by the connection means.

According to the above configuration example, when the information processing apparatus is in the used state, the communication via the access point is preferentially performed, and the communication is switched to the communication with the other information processing apparatus, if the access point is not found. Thus, appropriate communication can be performed in accordance with the surrounding environment.

In still another configuration example, when the state of the information processing apparatus is changed from the used state to the unused state, even if the data communication is performed by the first communication process means or the second communication process means, the connection means may stop the data communication and may start the first search and the second search in the unused state.

According to the above configuration example, when the state is changed from the used state to the unused state, the communication being performed at the time point is stopped, and the search process in the unused state is performed. Thus, in the unused state, an opportunity of performing communication without making the user notice it can be increased.

In still another configuration example, the first search means may repeatedly transmit a first search signal for searching for the other information processing apparatus and may attempt to receive the first search signal repeatedly transmitted from the other information processing apparatus, and the second search means may attempt to receive a second search signal repeatedly transmitted from the access point.

According to the above configuration example, when the other information processing apparatus is searched for, the information processing apparatus attempts to transmit and receive a search signal to and from the other information processing apparatus, and when the access point is searched for, the information processing apparatus attempts to receive a search signal. By so doing, the search can be efficiently performed.

In still another configuration example, the information processing apparatus may further comprise switch condition update means for updating a switch condition for the switching by the search switch means, and the search switch means automatically may switch between the first search and the second search on the basis of the switch condition updated by the switch condition update means.

According to the above configuration example, the search switch condition can be updated, and thus the condition can be set as appropriate in accordance with the situation.

In still another configuration example, the information processing apparatus may further comprise switch condition reception means for receiving the switch condition from a server, and the switch condition update means may update the switch condition to the switch condition received by the switch condition reception means.

According to the above configuration example, the search switch condition is received from the server and used for update, and thus update of the switch condition can be easy.

In still another configuration example, the first communication process means may connect directly to another information processing apparatus present in a range of short-distance wireless communication, by using the short-distance wireless communication, and may perform data communication with the other information processing apparatus, and the second communication process means may connect to a network via the access point, and may perform data communication with a server or another information processing apparatus via the network.

According to the above configuration example, communication with a close partner at a close place and communication with a partner at a distant place can be selectively and seamlessly performed.

In still another configuration example, the information processing apparatus may be a portable information processing apparatus.

According to the above configuration example, for example, when the user moves with the information processing apparatus when going out, various communications can be performed without making the user notice it. Thus, a surprise can be provided to the user, and a motivation to carry the information processing apparatus can be provided to the user.

A computer-readable storage medium having stored therein an information processing program according to the present invention is a computer-readable storage medium having stored therein an information processing program executed by a computer of an information processing apparatus. The information processing program causes the computer to operate as search means, first communication process means, and second communication process means. The search means automatically performs a search for another information processing apparatus and a predetermined access point. The first communication process means automatically performs data communication with the other information processing apparatus found by the search means. The second communication process means automatically performs data communication via the access point found by the search means.

An information processing method according to the present technology is an information processing method for controlling an information processing apparatus and comprises a search step, a first communication process step, and a second communication process step. The search step automatically performs a search for another information processing apparatus and a predetermined access point. The first communication process step automatically performs data communication with the other information processing apparatus found at the search step. The second communication process step automatically performs data communication via the access point found at the search step.

An information processing system according to the present technology is an information processing system includes a server and an information processing apparatus. The server comprises communication means for performing data communication with the information processing apparatus via a network. The information processing apparatus comprises search means, first communication process means, and second communication process means. The search means automatically performs a search for another information processing apparatus and a predetermined access point by using short-distance wireless communication. The first communication process means connects directly to the other information processing apparatus found by the search means, and automatically performs data communication with the other information processing apparatus. The second communication process means automatically performs data communication with the server via the access point found by the search means.

According to the above configuration example, the two types of communications, the communication performed with the other information processing apparatus and the communication performed with the server via the access point, can be selectively used in accordance with the situation.

According to the present technology presented herein, the two types of communications, the communication performed with the other information processing apparatus and the communication performed via the access point, can be automatically and selectively performed as appropriate, and various communications can be performed without making the user notice it.

These and other features, aspects and advantages of the present technology will become more apparent from the following detailed description of the present technology when taken in conjunction with the accompanying drawings.

BRIEF DESCRIPTION OF THE DRAWINGS

FIG. 3 is a block diagram illustrating an internal configuration of the game apparatus 10;

FIG. 6A is a diagram illustrating a search pattern according to the embodiment;

FIG. 6B is a diagram illustrating a search pattern according to the embodiment;

DESCRIPTION OF THE PREFERRED EMBODIMENTS

Figure 1:
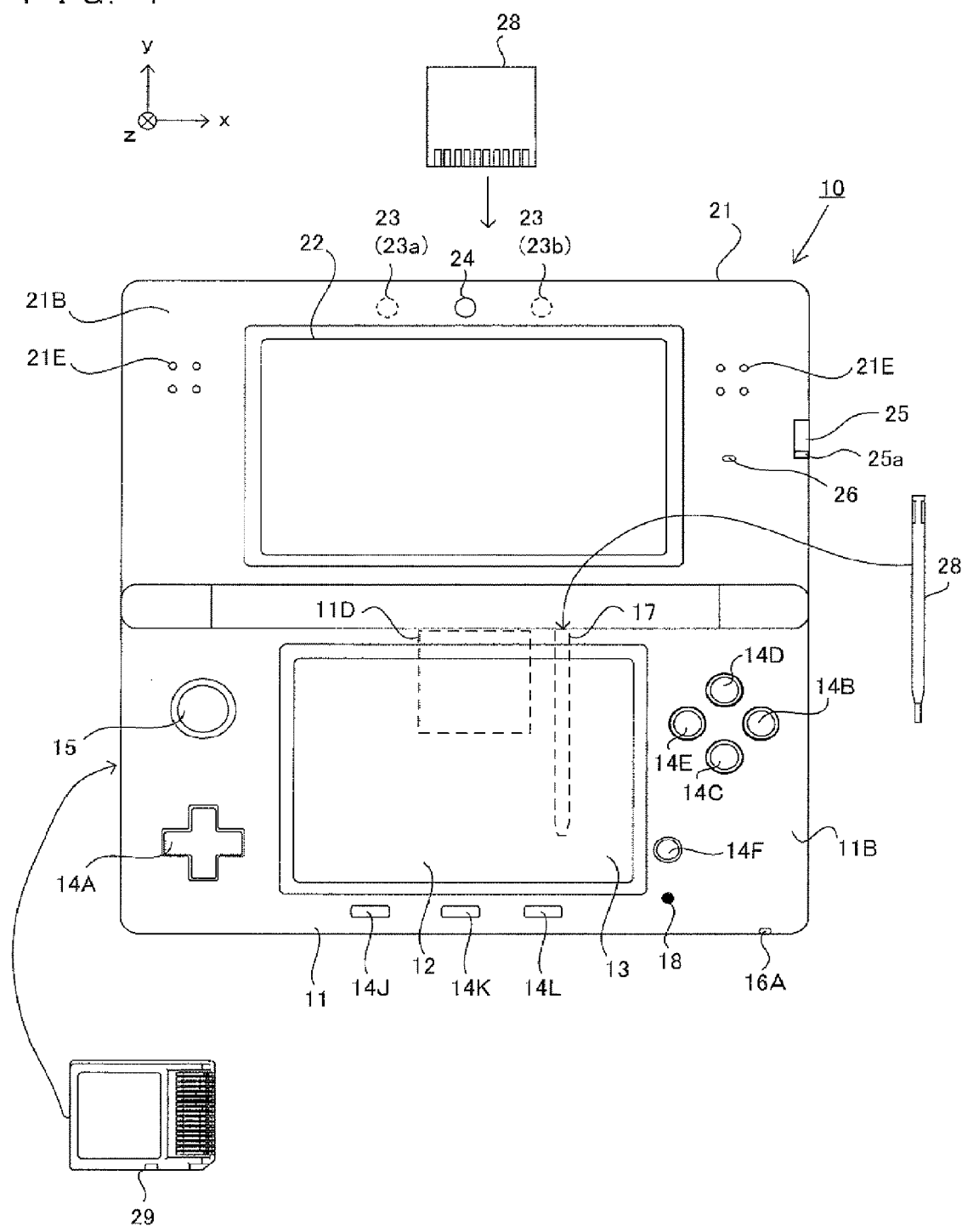
FIG. 1 is a front view of a game apparatus 10 in its opened state.

Hereinafter, an embodiment of the present technology presented herein will be described with reference to the drawings. It should be noted that the technology presented herein is not limited to the embodiment.

(Structure of Game Apparatus)

Hereinafter, a game apparatus that is one example of an information processing apparatus according to one embodiment will be described. A game apparatus 10 is a hand-held game apparatus. As shown in FIG. 1 and FIGS. 2A to 2D, the game apparatus 10 includes a lower housing 11 and an upper housing 21. The lower housing 11 and the upper housing 21 are connected to each other so as to be openable and closable (foldable).

(Description of Lower Housing)

As shown in FIG. 1 and FIGS. 2A to 2D, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided.

The touch panel 13 is mounted on the screen of the lower LCD 12. The insertion opening 17 (indicated by dotted lines in FIG. 1 and FIG. 2D) for accommodating a touch pen 28 is provided on an upper side surface of the lower housing 11.

A cross button 14A (direction input button 14A), a button 14B, a button 14C, a button 14D, a button 14E, a power button 14F, a selection button 14J, a HOME button 14K, and a start button 14L are provided on an inner side surface (main surface) of the lower housing 11.

An analog stick 15 is a device for instructing a direction.

The microphone hole 18 is provided on the inner side surface of the lower housing 11. Under the microphone hole 18, a microphone 42 (see FIG. 3) is provided as a sound input device described below.

Figure 2A:
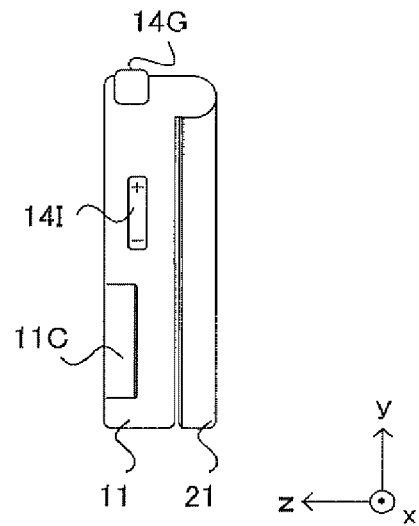
FIG. 2A is a left side view of the game apparatus 10 in its closed state.
Figure 2B:
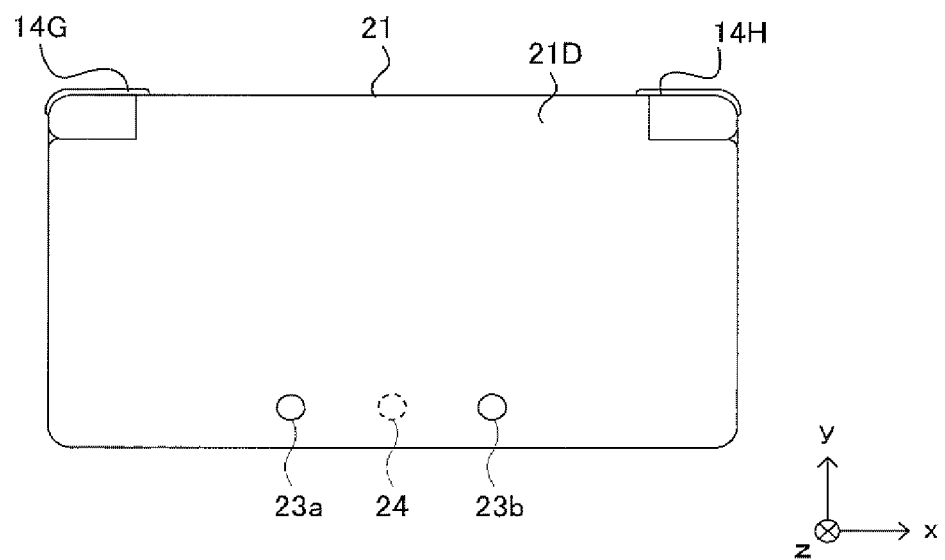
FIG. 2B is a front view of the game apparatus 10 in its closed state.
Figure 2C:
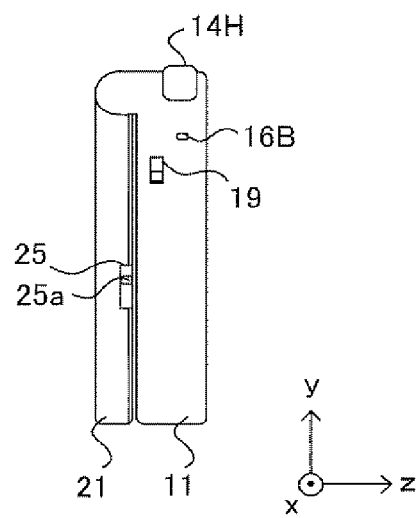
FIG. 2C is a right side view of the game apparatus 10 in its closed state.
Figure 2D:
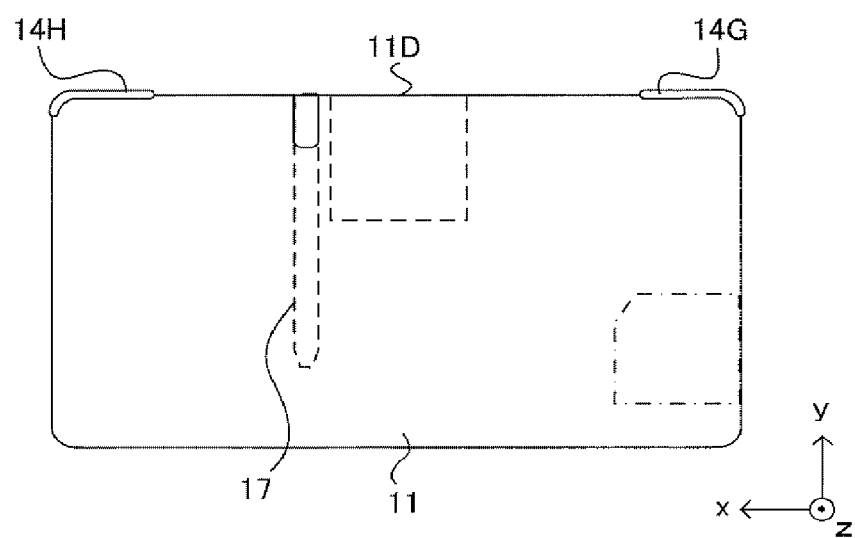
FIG. 2D is a rear view of the game apparatus 10 in its closed state.

As shown in FIGS. 2B and 2D, an L button 14G and an R button 14H are provided on the upper side surface of the lower housing 11. Further, as shown in FIG. 2A, a sound volume button 14I for adjusting volume of a speaker 43 (see FIG. 3) provided in the game apparatus 10 is provided on a left side surface of the lower housing 11.

As shown in FIG. 2A, a cover section 11C is provided on the left side surface of the lower housing 11 so as to be openable and closable. Inside the cover section 11C, a connector is provided for electrically connecting between the game apparatus 10 and an external data storage memory 29.

As shown in FIG. 2D, an insertion opening 11D through which an external memory 28 having a game program stored therein is inserted is provided on the upper side surface of the lower housing 11.

Further, as shown in FIG. 1 and FIG. 2C, a first LED 16A for notifying a user of an ON/OFF state of a power supply of the game apparatus 10 is provided on a lower side surface of the lower housing 11, and a second LED 16B for notifying a user of an establishment state of a wireless communication of the game apparatus 10 is provided on a right side surface of the lower housing 11. The game apparatus 10 is capable of performing wireless communication with another apparatus, and a wireless switch 19 for enabling/disabling the function of the wireless communication is provided on the right side surface of the lower housing 11 (see FIG. 2C).

(Description of Upper Housing)

As shown in FIG. 1 to FIGS. 2B and 2C, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided.

The upper LCD 22 is a display device capable of displaying a stereoscopically visible image. Specifically, the upper LCD 22 is a parallax barrier type display device capable of displaying an image that is stereoscopically visible with naked eyes. The upper LCD 22 allows a user to view the image for a left eye with her/his left eye, and the image for a right eye with her/his right eye by utilizing a parallax barrier, so that an image (a stereoscopically visible image) exerting a stereoscopic effect for a user can be displayed. Further, the upper LCD 22 may disable the parallax barrier. When the parallax barrier is disabled, an image can be displayed in a planar manner. Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed, for example, by the 3D adjustment switch 25 described below.

Two imaging sections (23a and 23b) provided on an outer side surface 21D of the upper housing 21 are generically referred to as the outer imaging section 23. The outer imaging section (left) 23a and the outer imaging section (right) 23b can be used as a stereo camera depending on a program executed by the game apparatus 10.

The inner imaging section 24 is provided in an inner side surface 21B of the upper housing 21 and acts as an imaging section that has an imaging direction that is the same direction as the inward normal direction of the inner side surface.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a.

The 3D indicator 26 is an LED indicating whether or not the upper LCD 22 is in the stereoscopic display mode.

Further, a speaker hole 21E is provided in the inner side surface of the upper housing 21. A sound is outputted through the speaker hole 21E from the speaker 43 described below.

(Internal Configuration of Game Apparatus 10)

Next, an internal electrical configuration of the game apparatus 10 will be described with reference to FIG. 3. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a first microcomputer 37, an acceleration sensor 39, a power supply circuit 40, an interface circuit (I/F circuit) 41, an open/close detector 46, and the like.

The information processing section 31 includes a CPU (Central Processing Unit) 311 for executing a predetermined program, a GPU (Graphics Processing Unit) 312 for performing image processing, a VRAM (Video RAM) 313, and the like. By executing a program stored in a memory (for example, the external memory 28 connected to the external memory I/F 33 or the internal data storage memory 35) inside the game apparatus 10, the CPU 311 performs a process corresponding to this program. The program executed by the CPU 311 may be obtained from another apparatus through communication with the other apparatus. In the present embodiment, the CPU 311 is capable of performing multitask control. The GPU 312 generates an image in accordance with an instruction from the CPU 311, and renders the image in the VRAM 313. The image rendered in the VRAM 313 is outputted to the upper LCD 22 and/or the lower LCD 12 and displayed on the upper LCD 22 and/or the lower LCD 12.

The external memory I/F 33 is an interface for detachably connecting to the external memory 28. The external data storage memory I/F 34 is an interface for detachably connecting to the external data storage memory 29.

The main memory 32 is a volatile storage device used as a work area and a buffer area for (the CPU 311 of) the information processing section 31.

The external memory 28 is a nonvolatile storage device for storing a program and the like executed by the information processing section 31. The external memory 28 is implemented as, for example, a read-only semiconductor memory.

The external data storage memory 29 is implemented as a non-volatile readable and writable memory (for example, a NAND flash memory), and is used for storing optional data.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of performing wireless communication with another communication apparatus. In the present embodiment, the wireless communication module 36 can implement two types of communication modes, "infrastructure communication" and "ad hoc communication" described below. The "infrastructure communication" is a function of connecting to a wireless LAN by using a method based on, for example, IEEE 802.11b/g/n standard. The "ad hoc communication" is a function of performing wireless communication with the same type of game apparatus by a predetermined communication method (for example, communication based on a unique protocol, infrared communication). Although described in detail below, three types of communication functions, "unnoticed communication", "passing communication", and "local communication", are selectively performed as appropriate by using the two types of communication modes in the present embodiment.

The wireless communication module 36 includes a second microcomputer 361, a RAM 362, and the like. The RAM 362 is used for storing programs for implementing the three types of communication functions described above. In particular, in the present embodiment, because of the capacity of the RAM 362 and the like, one program is appropriately selected from a program for the "unnoticed communication", a program for the "passing communication", and a program for the "local communication" in accordance with a desired communication function, and the selected program is stored in the RAM 363. In other words, a program to be executed is switched as appropriate. Then, the second microcomputer 361 controls execution of the above three communication functions on the basis of the program stored in the RAM 362.

The acceleration sensor 39 detects magnitudes of accelerations (linear accelerations) in the directions of the straight lines along the three axial (xyz axial) directions, respectively. The information processing section 31 can receive data (acceleration data) indicating accelerations detected by the acceleration sensor 39, and detect an orientation and a motion of the game apparatus 10.

The first microcomputer 37 performs processes such as a process concerning power management of the game apparatus 1, a process concerning time, a process of detecting opening or closing of the housing. In addition, the microcomputer 37 receives a notification concerning these processes from the CPU 311, and also provides a notification to the CPU 311. The microcomputer 37 has a real time clock (RTC) 371. The RTC 371 counts a time and outputs the time to the CPU 311 via the microcomputer 37. For example, the CPU 311 is capable of calculating a current time (date) and the like on the basis of the time counted by the RTC 371.

The first microcomputer 37 is connected to the open/close detector 46 and the power circuit 40. The open/close detector 46 detects opening or closing of the housing, and notifies the microcomputer 37 (further the CPU 311) of the detection result. The power circuit 40 controls power supplied from a power supply (typically, a battery accommodated in the lower housing 11) of the game apparatus 10 and supplies the power to each component of the game apparatus 10. In addition, the power circuit 40 receives a notification of shift to a sleep mode or cancellation of the sleep mode, from the microcomputer 37 (from the CPU 311 via the microcomputer 37). Then, the power circuit 40 performs control for appropriately supplying power, on the basis of the notification.

Now, a power control mode of the game apparatus 10 according to the present embodiment will be described. After the power supply such as a battery is mounted to the game apparatus 10 so as to allow power to be supplied to each component, the game apparatus 10 basically operates in any one of two power control modes that are a "normal power mode" and a "power saving mode". The "normal power mode" is a state where power is supplied to all the components. For example, when the user operates the game apparatus 10 and plays a predetermined game, or when the user operates various applications, the power control mode is the "normal power mode". The "power saving mode" is a state where power supply to only some of the components is continued and power supply to the other components is stopped. In the present embodiment, the "power saving mode" includes a "sleep mode". The "sleep mode" is a state where power is supplied to only the first microcomputer 37 and the wireless communication module 36 and power supply to the other components such as the CPU 311 and the LCDs is stopped (it should be noted that the CPU 311 is capable of receiving an instruction for cancelling the "sleep mode"). Further, in the "sleep mode", the microcomputer 37 and (the second microcomputer 361 of) the wireless communication module 36 repeatedly perform processes called "microcomputer process" and "during-sleep BG communication process", respectively, in predetermined cycles. These processes will be described in detail below.

In the present embodiment, in addition to the method of shifting to the sleep mode or cancelling the sleep mode on the basis of the detection result of the open/close detector 46 as described above, it is possible to change the power control mode between the "normal power mode" and the "sleep mode" in accordance with an operation of the power button 14F. Moreover, in addition to an operation of the power button 14F, it is possible to automatically cancel the "sleep mode" or shift to the "sleep mode" by a process described below. For example, after the user finishes playing a certain game, if the user presses the power button 14F (it seems to the user that this operation is an operation to turn off the power), the game apparatus 10 shifts to the "sleep mode". In this state, the user can close and carry the game apparatus 10. Then, if the user opens the game apparatus 10 and presses the power button 14F again, the "sleep mode" is cancelled and the game apparatus 10 shifts to the "normal power mode". Alternatively, the game apparatus 10 may shift to the "sleep mode" when a predetermined time period elapses from the last operation.

Further, by pressing the power button 14F for a predetermined time period or longer, it is possible to shift to a "complete stop mode" in which power supply to all the components including the first microcomputer 37 and the wireless communication module 36 is stopped (namely, the power is completely turned off). In this case, if the power button 14F is pressed for the predetermined time period or longer, the game apparatus 10 starts up to shift to the "normal power mode".

Here, in view of whether or not the user is using the game apparatus 10, the power control mode can be rephrased as follows. That is, the game apparatus 10 has two states, namely, a "used state" and an "unused state". The "used state" is a state where the normal power mode continues since the user opens the housing of the game apparatus 10 and directly uses the game apparatus 10. For example, a state where the user plays a game or the like by operating the operation button 14 or the like, corresponds to this state. On the other hand, the "unused state" is a state where the user does not independently and directly use the game apparatus 10. The "unused state" also includes a state where the power control mode is the "sleep mode" since the housing is closed, as well as a state where, in performing the "unnoticed communication" or the "passing communication" described below, the "sleep mode" is temporarily cancelled (while the housing is closed), a process concerning the "unnoticed communication" or the "passing communication" is performed, and the game apparatus 10 returns to the "sleep mode" after performing the "unnoticed communication" or the "passing communication". For example, a state where the user closes the housing of the game apparatus 10 and the game apparatus 10 is put in a bag when the user goes out, is the "unused state". Further, as described above, a state where the "sleep mode" is temporarily cancelled while the game apparatus 10 is put in the bag and the user goes out, and a state where the game apparatus 10 shifts to the "sleep mode" again after the "unnoticed communication" is performed (in this state, the user does not use the game apparatus 10), are also the "unused state". Further, in addition to opening or closing of the housing, the trigger for changing the state of the game apparatus 10 between the "used state" and the "unused state" also includes an operation of the power button 14F. In other words, the user has been playing a game (used state), and, then, by the user pressing the power button 14F of the game apparatus 10 after finishing the game play, the state of the game apparatus 10 is changed from the "used state" to the "unused state". Further, for example, when the user has not performed any operation for a constant time period, the state of the game apparatus 10 may be changed from the "used state" to the "unused state".

In the following description, for simplification of explanation, the power control mode will be described using an example where only the "normal power mode" and the "sleep mode" are used.

The touch panel 13, the microphone 42 and the speaker 43 are connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data on the basis of a signal outputted from the touch panel 13, and outputs the touch position data to the information processing section 31. The information processing section 31 obtains the touch position data, to recognize a position on which an input is made on the touch panel 13.

The operation button 14 includes the operation buttons 14A to 14L described above, and operation data indicating an input state of each of the operation buttons 14A to 14L (whether or not each button has been pressed) is outputted from the operation button 14 to the information processing section 31.

The lower LCD 12 and the upper LCD 22 are connected to the information processing section 31. Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye that are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 each take an image in accordance with an instruction from the information processing section 31, and output data of the taken image to the information processing section 31.

The 3D adjustment switch 25 transmits an electrical signal corresponding to the position of the slider 25a, to the information processing section 31.

The information processing section 31 controls whether or not the 3D indicator 26 is to be lit up. For example, the information processing section 31 lights up the 3D indicator 26 when the upper LCD 22 is in the stereoscopic display mode.

Next, an outline of a process assumed in the present embodiment will be described. The game apparatus 10 of the present embodiment perform two types of communications called the "passing communication" and the "unnoticed communication" described below, as communications performed as background processes. Meanwhile, the game apparatus 10 has two states, namely, the "sleep mode" and the "normal power mode". The process according to the present embodiment mainly relates to control of the above two types of communications in accordance with such two states of the game apparatus 10.

(Entire Configuration of Network)

Figure 4:
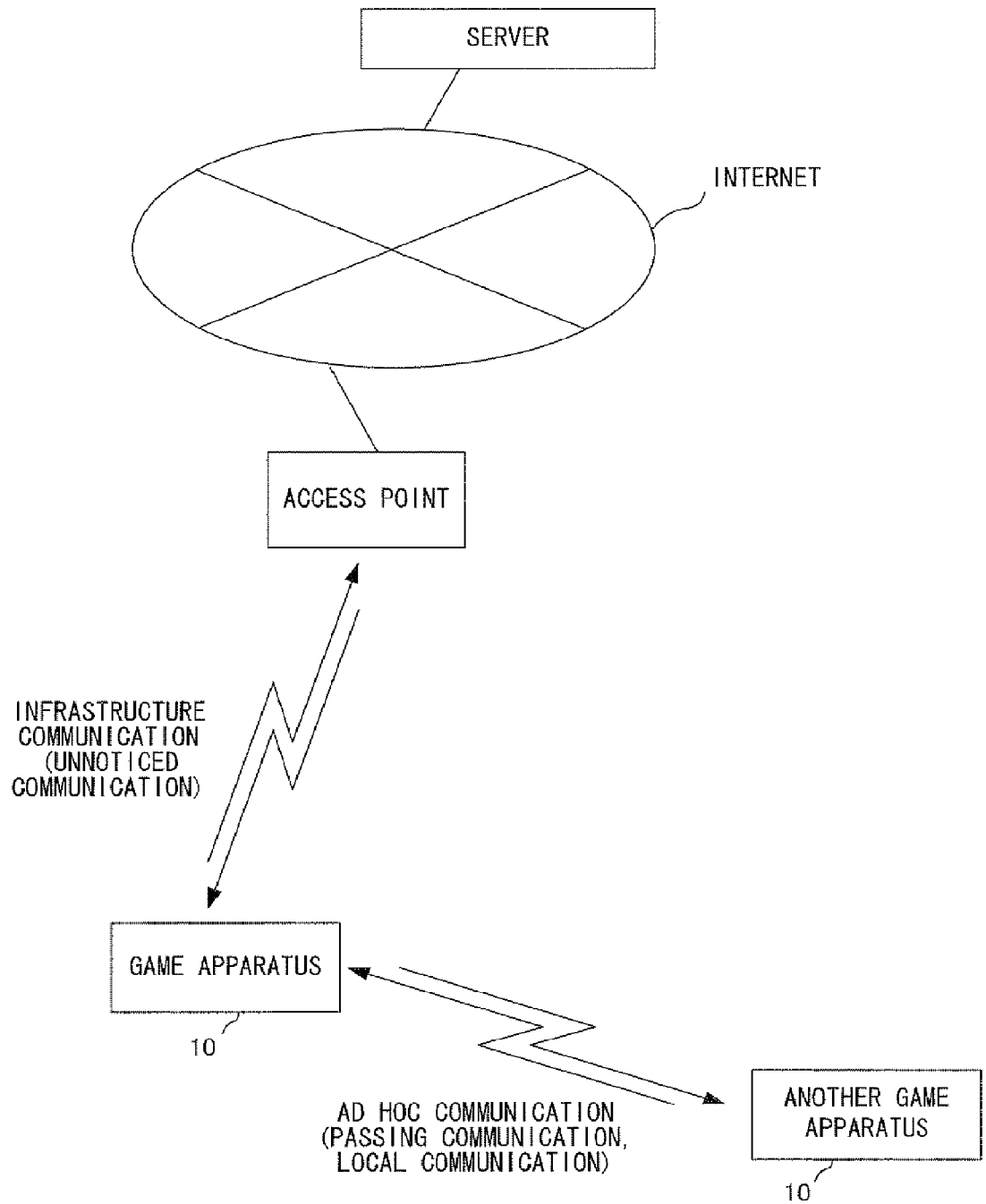
FIG. 4 is a schematic diagram illustrating the entirety of a network configuration according to an embodiment.

First, the entire configuration of a network assumed in the present embodiment will be described. FIG. 4 is a schematic diagram illustrating the entirety of the network configuration according to the present embodiment. The game apparatus 10 shown in FIG. 4 uses the two main types of communication modes as described above. A first communication mode is the "infrastructure communication" in which the Internet is used. In this mode, the game apparatus 10 performs communication with a predetermined server via an access point (hereinafter, referred to merely as AP). In the present embodiment, the communication function of the "unnoticed communication" is implemented by using the communication mode of the "infrastructure communication". A second communication mode is the "ad hoc communication" in which game apparatuses are directly connected to each other not via the Internet. In the present embodiment, the two communication functions of the "passing communication" and the "local communication" are implemented by using the communication mode of the "ad hoc communication". Hereinafter, an outline of these three communication functions will be described.

(Unnoticed Communication)

First, the "unnoticed communication" will be described. This communication function is communication performed in the background. In this communication function, the game apparatus 10 connects to a predetermined server via an AP and performs transmission/reception of predetermined data with the server. For example, the following communication is performed. For example, the case is assumed where the game apparatus 10 is in the "sleep mode". In this case, when a connectable AP is present near the game apparatus 10, the game apparatus 10 automatically connects to the AP, and further automatically connects to a predetermined server via the AP. Then, for example, a trial version program of a new game is transmitted from the server, and received by the game apparatus 10. Thereafter, various settings (an install process and the like) are performed such that the trial version program becomes executable. Thus, for example, when the user causes the game apparatus 10 to shift to the "sleep mode" and goes out and then comes back home and returns the game apparatus 10 to the "normal power mode", the trial version of the new game has been added to menu without making the user notice it. Further, when the game apparatus 10 is in the "normal power mode" as well, the "unnoticed communication" is performed in the background. In such a case, for example, while a game is played, a trial version program or the like as described above is received in the background, and when the user finishes playing the game and switches to the home menu of the game apparatus 10, the trial version of the new game has been added to the menu without making the user notice it. It should be noted that, in the present embodiment, a dedicated server is provided as a server connected in the "unnoticed communication" (a communication partner in the "unnoticed communication"), and it is possible to connect to the dedicated server via any AP.

In the present embodiment, execution of the "unnoticed communication" is managed in a unit called "task". A plurality of "tasks" can be defined. In each "task", contents of data to be transmitted/received, a timing (schedule) to perform a transmission/reception process, and the like are defined. Examples of contents performed in each "task" include "update of a system" and "obtaining a trial version of a new game". Further, there is a "task" of performing transmission/reception of predetermined data for each of various applications installed in the game apparatus 10. For example, in a racing game, such a task is a task of periodically transmitting a lap time of the user to a server and receiving data of a national ranking from the server.

In the present embodiment, on the basis of the execution schedule defined in each "task", it is determined whether or not the execution time of each "task" has come. When there is a "task" of which the execution time has come, transmission/reception of predetermined data is performed with a predetermined server in accordance with the defined content of the "task". Here, in the present embodiment, in order to perform the "unnoticed communication", it is necessary to connect to a predetermined AP (and a server). Thus, even when the execution time of a "task" has come, if no AP is present within the communicable range of the game apparatus 10, the "unnoticed communication" based on the "task" cannot be performed at that time. In such a case, execution of this "task" is suspended, and transmission/reception is performed with the server at a timing when the game apparatus 10 becomes communicable with an AP and the server.

As described above, the "unnoticed communication" is a process that is a background process of automatically connecting to a predetermined server via an AP and automatically performing transmission/reception of predetermined data.

It should be noted that the "infrastructure communication" is used for not only the "unnoticed communication" but also a process in which the Internet is used by the user executing an application such as a web browser. In other words, when being connected to an AP, the game apparatus 10 can perform the "unnoticed communication", and also can perform communication for using the Internet (on the basis of an operation of the user). However, a communication process using the "infrastructure communication" other than the "unnoticed communication" is not directly relevant to the present embodiment, and thus the detailed description thereof is omitted.

(Passing Communication)

Next, the "passing communication" will be described. This process is also a process performed in the background. In the "passing communication", game apparatuses 10 are directly connected to each other (peer-to-peer connection), and transmission/reception of data, which is previously prepared for the "passing communication", is performed. Specifically, a data area for the "passing communication" is previously provided in the internal data storage memory 35 of each game apparatus 10. This area is managed in a unit called "slot". In the present embodiment, 12 slots are previously provided. Each "slot" is associated with one of applications executable in the game apparatus 10. Each slot includes a data area for transmission and a data area for reception. The number of the slots is merely one example, the present invention is not limited thereto, and the number of the slots may be less or more than 12.

The "passing communication" is performed in the flow described below. The following assumption is made. First, while a predetermined application is executed, transmission data for the "passing communication" is stored in the corresponding slot as appropriate (each application has been associated with a slot). Then, the application is ended, and the game apparatus 10 is caused to shift to the "sleep mode" by the user. Then, the user goes out with the game apparatus 10 and another game apparatus 10 enters the communicable range of the game apparatus 10. In this case, contents of slots corresponding to common applications are transmitted/received between the game apparatuses 10. In other words, transmission data in a slot of a game apparatus A is transmitted to a game apparatus B, and transmission data transmitted from the game apparatus B is received by the game apparatus A and stored as reception data. Thus, with regard to the common applications associated with the slots of the game apparatuses, transmission/reception of data is performed. When there is no common application in the slots of the game apparatuses, the transmission/reception of data as described above is not performed, and, as a result, the "passing communication" is not performed.

As described above, the "passing communication" is communication in which transmission/reception (exchange) of data for the "passing communication" is automatically performed as a background process directly between the game apparatuses 10.

(Local Communication)

Next, the "local communication" will be described. This communication is communication performed in the foreground. For example, this communication is performed while a versus game or the like is played. In other words, the "local communication" corresponds to the case where the game apparatuses 10 are connected to each other in the mode of the ad hoc communication and a transmission/reception process of operation data and the like of each game apparatus 10 is performed as part of a versus game process. In other words, the "local communication" is not automatically performed like the "passing communication", and is performed, for example, when the users desire to perform the "local communication" by input operations and agree with each other before starting the versus game.

As described above, in the present embodiment, the three types of communication functions can be used. Here, on the assumption that these communication functions are performed, a search process for determining whether or not a connection target is present within the communicable range is needed. In other words, for the "unnoticed communication", it is necessary to search for a connectable AP, and for the "passing communication" and the "local communication", it is necessary to search for another game apparatus 10 that is connectable. Meanwhile, the game apparatus 10 has only one wireless communication module 36 as described above. Thus, the above communication functions cannot be performed simultaneously, and are selectively performed as appropriate in accordance with the use situation. In the present embodiment, for the "unnoticed communication" and the "passing communication", which are communications performed in the background, search switch control in predetermined cycles is performed. Hereinafter, an outline of switch control of searches for the "unnoticed communication" and the "passing communication", which are performed in the background, (hereinafter, may be collectively referred to as background search) will be described with control in the "sleep mode" and control in the "normal power mode".

(Switch Control in Sleep Mode)

Figure 5:
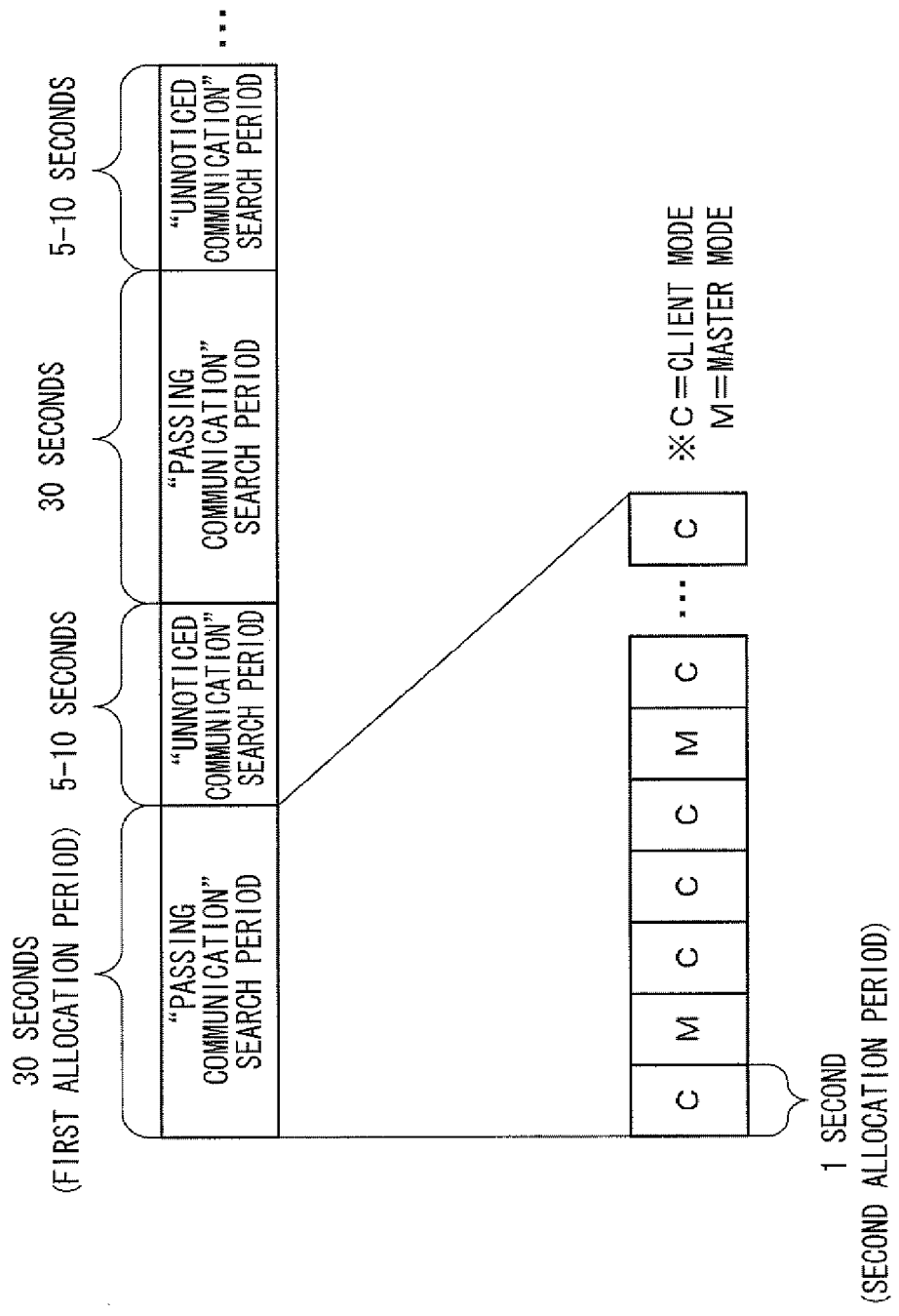
FIG. 5 is a diagram illustrating a search pattern according to the embodiment.

First, switch control in the case of the "sleep mode" will be described. In the present embodiment, in this case, searches for the "unnoticed communication" and the "passing communication" are switched in cycles (a search pattern) as shown in FIG. 5. In FIG. 5, initially, a period of 30 seconds is set as a search period for the "passing communication". In other words, during this period of 30 seconds, the search for the "passing communication" (a search for another game apparatus 10) is performed. Hereinafter, the search period for the "passing communication" may be referred to as a first allocation period. Then, the search process for the "unnoticed communication" is performed once. The search process is a process of searching for an AP, and a period until a result of the search is obtained is unstable due to the radio field intensity between an AP and the game apparatus and the like. Thus, in FIG. 5, as an example, the period is set to 5 to 10 seconds. Then, the search for the "passing communication" is performed for 30 seconds again, and the search process for the "unnoticed communication" is performed once. In other words, a pattern, in which the search process for the "passing communication" is performed for 30 seconds and then the search process for the "unnoticed communication" is performed once, is repeated.

When a connection target is found as a result of the search, the "passing communication" or the "unnoticed communication" is performed. When the "passing communication" or the "unnoticed communication" is started, the above search process is not performed until a series of communication processes concerning the communication is completed. For example, even when, during the search period for the "passing communication", another game apparatus 10 is found at an elapse of 25 seconds and the "passing communication" is started, the search process for an AP is not performed until a series of transmission/reception processes concerning the "passing communication" is finished.

Here, an operation of the search for the "passing communication" during the period of 30 seconds (first allocation period) will be described in more detail. In the present embodiment, in a process of establishing a connection in the "passing communication", either game apparatus serves as a "master apparatus", and the other game apparatus serves as a "slave apparatus". Then, during the period of 30 seconds, the game apparatus 10 performs the search process while selectively serving as a "master apparatus" and a "slave apparatus". Here, a mode in the case where the game apparatus 10 serves as a "master apparatus" is referred to as "master mode", and a mode in the case where the game apparatus 10 serves as a "slave apparatus" is referred to as "client mode". In the "client mode", the game apparatus 10 broadcasts a beacon indicating that the game apparatus 10 requests a connection. The beacon includes data (e.g., a predetermined ID) indicating that this beacon is a beacon for the "passing communication". Meanwhile, in the "master mode", the game apparatus 10 attempts to receive the beacon transmitted from another game apparatus 10 (that is, becomes a state of waiting for the beacon from another game apparatus 10). Specifically, in the "master mode", the game apparatus 10 receives a beacon and determines whether or not the received beacon includes data indicating that this beacon is a beacon for the "passing communication". When the data is not included, the game apparatus 10 discards the beacon and performs reception of another beacon. When the data is included, the game apparatus 10 performs a process for the "passing communication" (a connection establishing process, a data transmission/reception process, and the like).

Then, in the present embodiment, for example, the period of 30 seconds is divided into periods of 1 second (hereinafter, each period of 1 second is referred to as a second allocation period). A mode switch pattern is set such that the game apparatus 10 basically operates in the "client mode" and shifts to the "master mode" once every 5 seconds. Since the power consumption in the "master mode" is greater than the power consumption in the "client mode", this switch cycle is derived in view of the balance between easiness of performing the "passing communication" and reduction of the power consumption.

As described above, in the "sleep mode", the switch control is performed in the switch pattern in which the search for the "passing communication" is repeatedly performed for 30 seconds, then the search for the "unnoticed communication" is performed once, and then the search for the "passing communication" is performed for 30 seconds again. In other words, control is performed in such a manner that the "passing communication" is prioritized over the "unnoticed communication". In the case of the "sleep mode", it is typically considered that the game apparatus 10 is carried outside the user's house with the housing closed. Thus, this control is performed from the standpoint that an environment where communication is easily performed with another game apparatus 10 by using the "passing communication" is provided to the game apparatus 10.

(Switch Control in Normal Power Mode)

Next, an outline of switch control in the "normal power mode" will be described. In this case as well, switch control of the background search is basically performed in the same pattern as that in the case of the "sleep mode". In other words, in this pattern, the search for the "passing communication" is performed for 30 seconds, then the search for the "unnoticed communication" is performed once, and the search for the "passing communication" is performed for 30 seconds again. However, unlike the case of the "sleep mode", in the case of the "normal power mode", when a communicable AP is detected as a result of the search for the "unnoticed communication" and a connection is established to the AP (and a server ahead of the AP), even after a series of transmission/reception processes concerning the "unnoticed communication" is finished, the connection to the AP is not cut off but is maintained. FIG. 6A is a schematic diagram illustrating an example of such switch control in the normal power mode. When an AP is detected as a result of the search for the "unnoticed communication" and a connection is established to the AP, the connection to the AP is maintained until communication with the AP becomes disenabled (e.g., until the game apparatus 10 is moved such that the AP is not present within the communicable range of the game apparatus 10). In other words, in the "normal power mode", control is performed in such a manner that the "unnoticed communication" (infrastructure communication) is prioritized. In the case of the "normal power mode", a state where the user uses the game apparatus 10 by performing an operation is considered. For example, the case where the user activates a browser and uses the Internet, and the case where the user desires to perform a process of displaying login states of friends registered in a so-called "friend list" for confirming the login states, are considered. In other words, there is a high possibility that it is necessary to perform a process using the "infrastructure communication". In this respect, this control is performed such that a process based on the "infrastructure communication" is smoothly performed.

As described above, in the present embodiment, with regard to the communication performed in the background, in the "sleep mode", control is performed such that the "passing communication" is easily performed, and in the "normal power mode", control is performed such that the "unnoticed communication" (infrastructure communication) is easily performed. By so doing, the possibility of performing a desired communication mode can be changed in accordance with the used state of the game apparatus 10.

It should be noted that when the user closes the housing and an instruction to shift to the "sleep mode" is issued while communication is performed in the background in the "normal power mode", even though the communication process is being performed, the communication process is stopped and the game apparatus 10 shifts to the "sleep mode". Then, the background search process with the search pattern in the "sleep mode" as shown in FIG. 5 is started.

Next, switch control in the "normal power mode" between the "passing communication" and the "unnoticed communication", which are the background communications; and the "local communication", which is the foreground process, will be described. Since the "passing communication" and the "unnoticed communication" are the background communications, communication can be performed in parallel with execution of a predetermined application. Meanwhile, the game apparatus 10 has only one wireless communication module 36 as described above. Thus, for example, when a versus game process (a foreground process) using the "local communication" is performed, the "local communication" cannot be performed in a state where the wireless communication module 36 is used in the background communication. Further, when the "local communication" is not performed in a foreground application but, for example, transmission/reception of large-sized data is performed in the "unnoticed communication", the processing load temporarily increases due to the influence of the transmission/reception, and the increase in processing load may influence the execution speed of the foreground application. Therefore, in the present embodiment, the background search and the like can be stopped by the application issuing an instruction to stop the background communication. By so doing, for example, when a versus game process is performed by using the "local communication" as described above, an application for the versus game issues an instruction to stop the background communication (to the system). The process of the background communication and the background search that are being performed are stopped in accordance with the instruction, and the wireless communication module 36 is substantially unused. Then, the application for the versus game can perform a process concerning the "local communication" by using the wireless communication module 36. Then, when a notification of cancellation of the stop is issued from the application and the stop instruction is invalidated, and the background search is started again (see FIG. 6B). It should be noted that an application that can issue a stop instruction is not limited to one being executed in the foreground, and an application being executed in the background can issue a stop instruction.

Next, the above-described processes performed in the game apparatus 10 will be described in detail. First, main programs and data that are used in the processes will be described. Prior to this description, components that perform the processes in the present embodiment will be described. In the present embodiment, the first microcomputer 37, the second microcomputer 361, and the CPU 311 independently perform processes described below, and these processes are performed in a cooperative manner and in parallel with each other.

Figure 7:
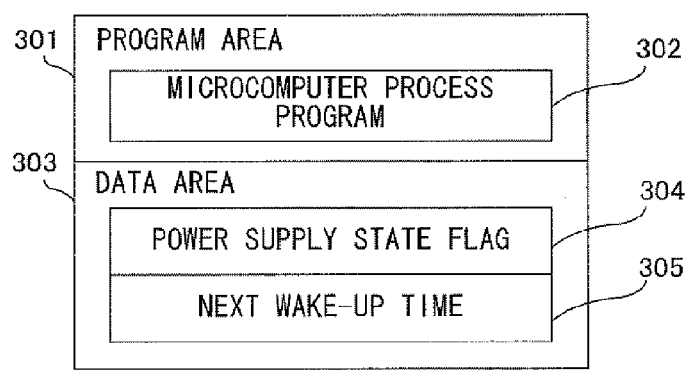
FIG. 7 is a diagram illustrating main data stored in a storage area included in a first microcomputer 37.

FIG. 7 is a diagram illustrating main data stored in a storage area (not shown) included in the first microcomputer 37. In the first microcomputer 37, a program area 301 and a data area 303 are present. In the program area 301, a microcomputer process program 302 for the first microcomputer 37 to perform processes is stored. In the data area 303, a power supply state flag 304 and a next wake-up time 305 are stored. The power supply state flag 304 indicates whether or not the game apparatus 10 is in the "sleep mode". When the power supply state flag 304 is set to ON, it indicates that the game apparatus 10 is in the "normal power mode". When the power supply state flag 304 is set to OFF, it indicates that the game apparatus 10 is in the "sleep mode". The next wake-up time 305 is data indicating a time to cancel the "sleep mode". For example, in the present embodiment, the earliest time among the next execution times set for the above tasks, respectively, is set as the next wake-up time 305.

Figure 8:
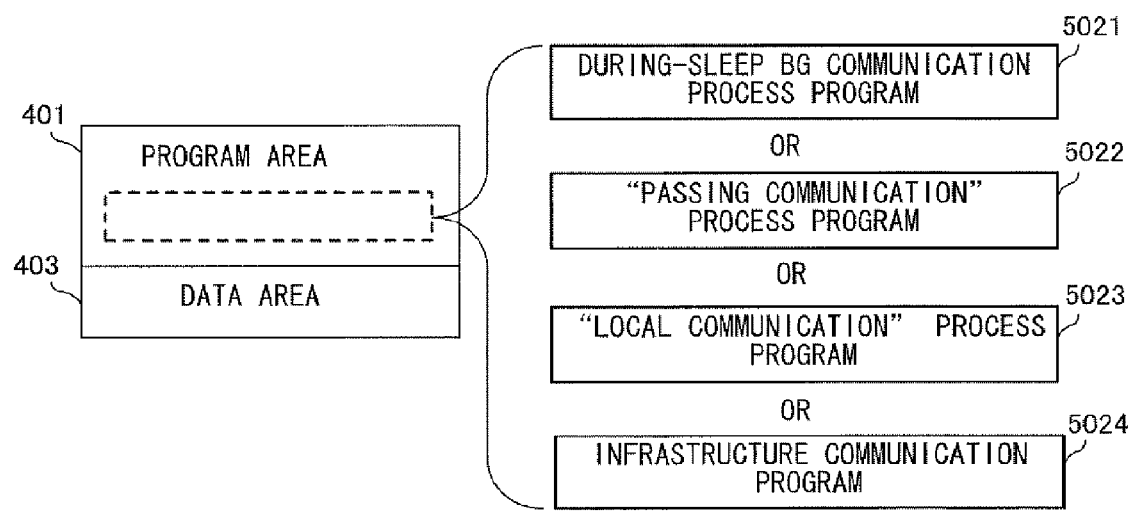
FIG. 8 is a diagram illustrating main data stored in a RAM 362.

FIG. 8 is a diagram illustrating main data stored in the RAM 362 included in the wireless communication module 36. In the RAM 362, a program area 401 and a data area 403 are present. In the program area 401, any one of a during-sleep BG communication process program 5021, a "passing communication" process program 5022, a "local communication" process program 5023, and an infrastructure communication program 5024, which will be described below, is selected as appropriate and stored. In the data area 403, information on APs and the like are stored. It should be noted that the during-sleep BG communication process program 5021 and the "passing communication" process program 5022 may be the same. In this case, each process operation can be changed by setting different parameters.

Figure 9:
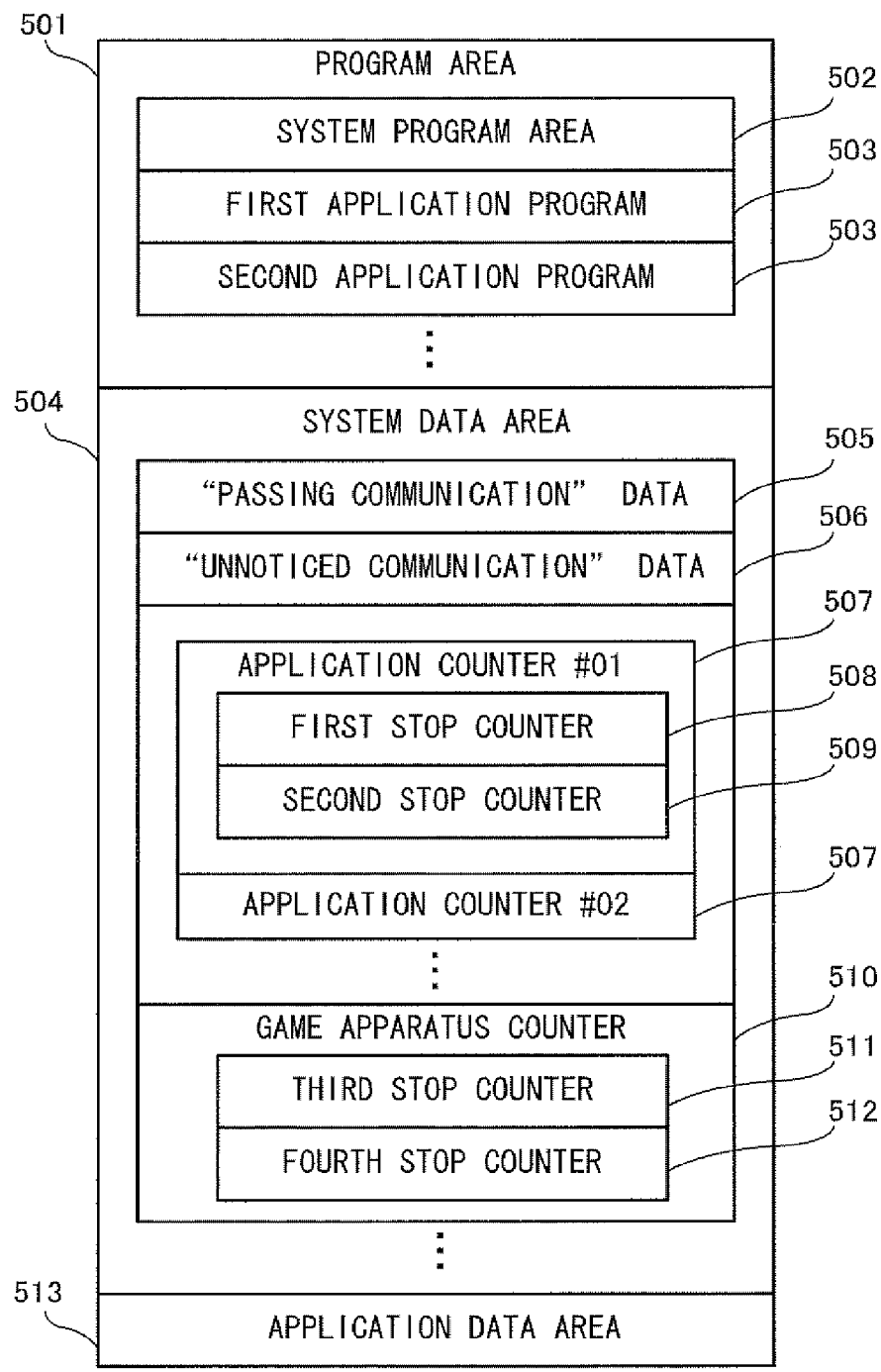
FIG. 9 is a diagram illustrating programs and data stored in an internal data storage memory 35.
Figure 10:
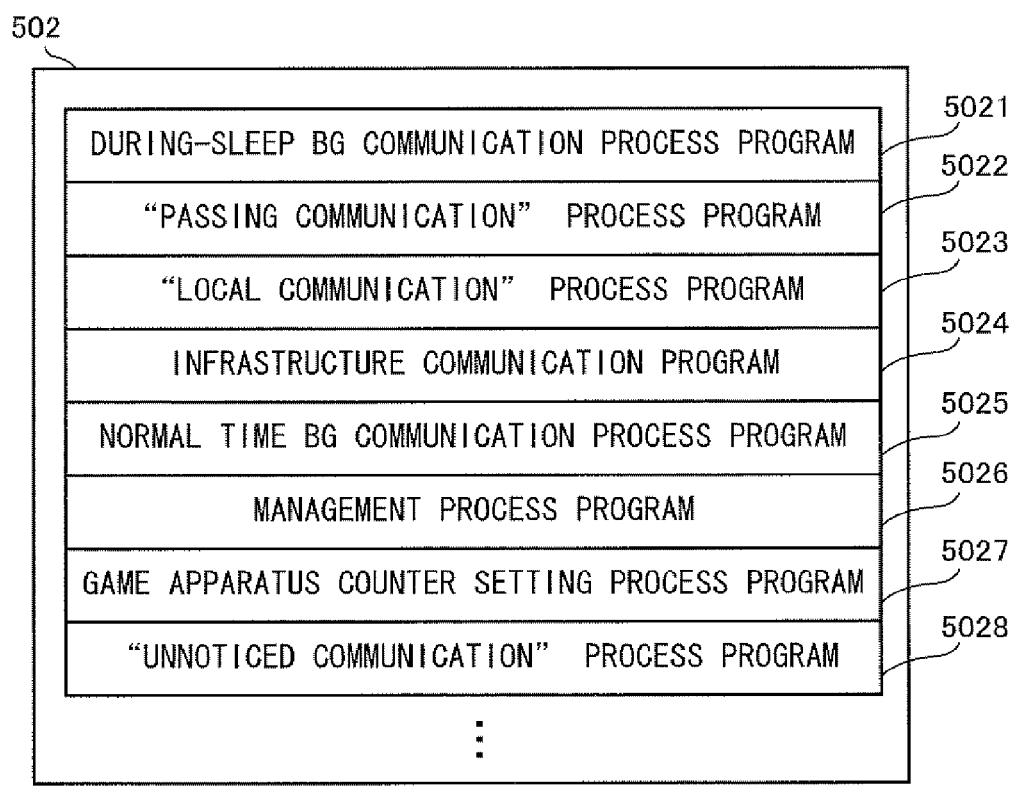
FIG. 10 is a diagram illustrating main programs stored in a system program area 502.

FIG. 9 is a diagram illustrating programs and data stored in the internal data storage memory 35. These pieces of data are expanded on the main memory 32 and executed as necessary. The internal data storage memory 35 has a program area 501, a system data area 504, and an application data area 513. In the program area 501, a system program area 502 is provided, and a plurality of application programs (each indicated as an nth application program in FIG. 9) is stored. In the system program area 502, a plurality of programs is stored as shown in FIG. 10. In FIG. 10, the during-sleep BG communication process program 5021, the "passing communication" process program 5022, the "local communication" process program 5023, the infrastructure communication program 5024, a normal time BG communication process program 5025, a management process program 5026, a game apparatus counter setting process program 5027, and an "unnoticed communication" process program 5028 are stored in the system program area 502.

Figure 11:
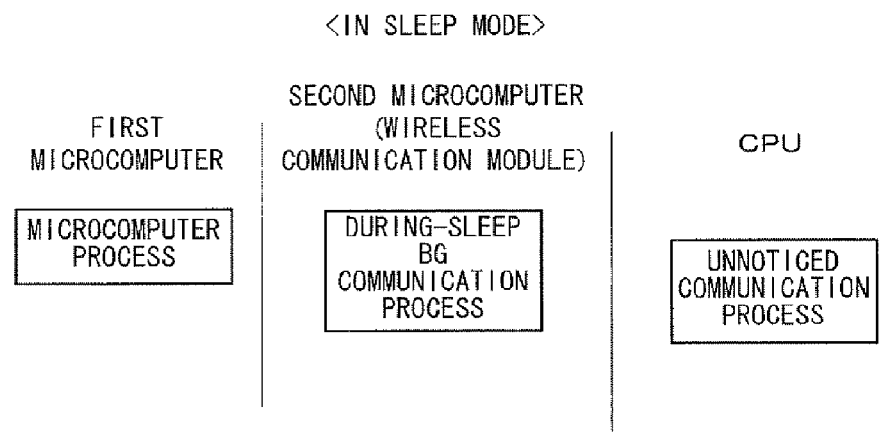
FIG. 11 is a diagram illustrating each performing component and a process performed by each performing component in a "sleep mode"
Figure 12:
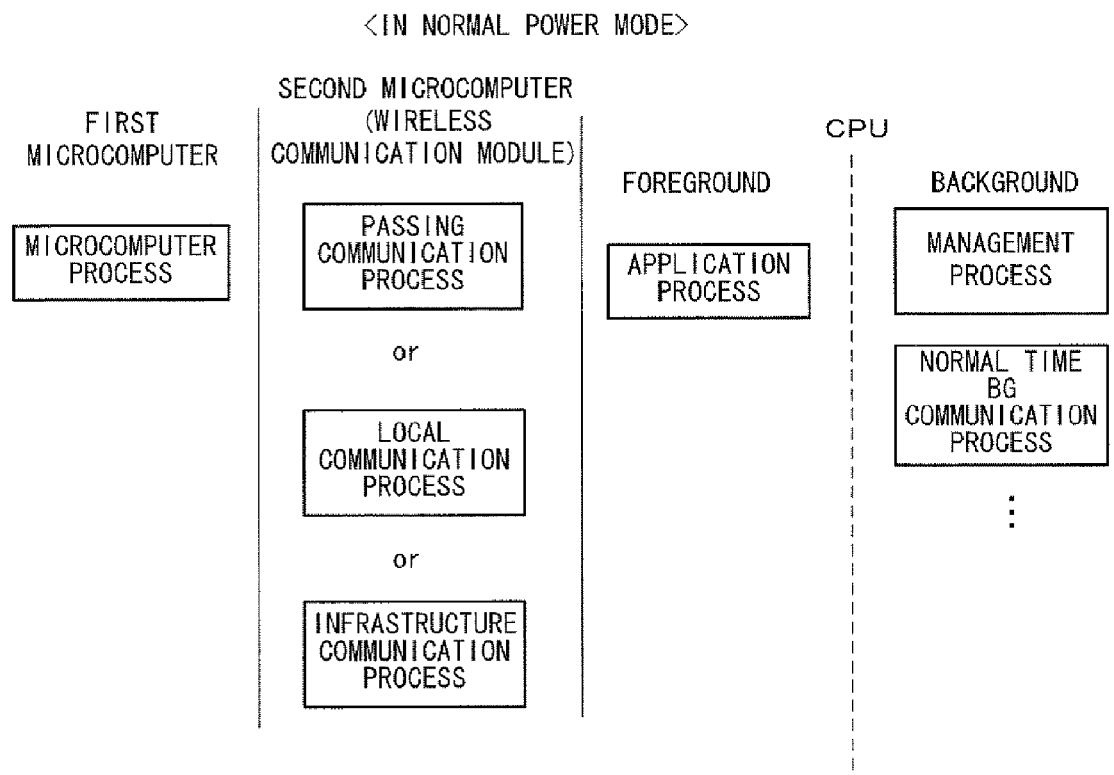
FIG. 12 is a diagram illustrating each performing component and a process performed by each performing component in a "normal power mode"

Here, the relation between processes performed on the basis of these programs; and the first microcomputer 37, the second microcomputer 361, and the CPU 311 that perform these processes, will be described briefly. FIG. 11 is a diagram illustrating each performing component and a process performed by each performing component in the "sleep mode". FIG. 12 is a diagram illustrating each performing component and a process performed by each performing component in the "normal power mode". In FIG. 11, by performing a microcomputer process, the first microcomputer 37 performs management of the execution times of the above tasks (the "unnoticed communication") and detection of opening/closing of the housing. In addition, the second microcomputer 361 performs a during-sleep BG communication process. This process is performed for performing the background search and the like according to the switch pattern shown in FIG. 5. Since the game apparatus 10 is basically in the "sleep mode", power is not supplied to the CPU 311 in this state. However, when, in the microcomputer process, it is detected that the execution time of the task has come and it is determined that the game apparatus 10 is in a state of being communicable with an AP, power is temporarily supplied to the CPU 311 and the CPU 311 performs a process concerning the "unnoticed communication". In addition, when, in a microcomputer process of the wireless communication module 36, it is determined that an AP is found (detected), power is temporarily supplied to the CPU 311 and the CPU 311 performs the process concerning the "unnoticed communication". Further, when, in the microcomputer process of the wireless communication module 36, it is determined that another game apparatus is found (detected), power is temporarily supplied to the CPU 311 and the CPU 311 performs a data exchange process concerning the "passing communication".

In FIG. 12, the first microcomputer 37 performs the same operation as that in the "sleep mode". The second microcomputer 361 performs any one of the programs for the "passing communication", the "local communication", and the "infrastructure communication", depending on the situation. The CPU 311 performs a predetermined application process as a foreground process. In addition, the CPU 311 performs a management process and a normal time BG communication process as background processes. In the management process, monitoring of an instruction to activate an application, monitoring of an instruction to stop the background communication from an application as described above, and the like are mainly performed. The normal time BG communication process is a process for performing the "passing communication" or the "unnoticed communication" in the "normal power mode". It should be noted that in the present embodiment, a plurality of applications can be activated, but only one application is executed in the foreground and the applications other than the application executed in the foreground are executed as background processes as appropriate.

Referring back to FIG. 9, the system data area 504 will be described next. In the system data area 504, "passing communication" data 505, "unnoticed communication" data 506, an application counter 507, a game apparatus counter 510, and the like are stored.

Figure 13:
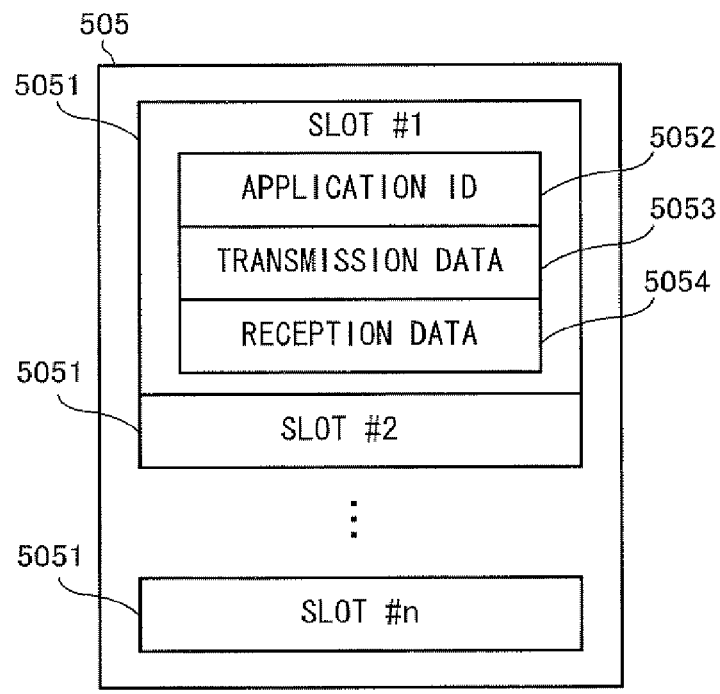
FIG. 13 is a diagram illustrating an example of a data structure of "passing communication" data 505.

The "passing communication" data 505 is used in the "passing communication". FIG. 13 is a diagram illustrating an example of a data structure of the "passing communication" data 505. The "passing communication" data 505 consists of a set of slots 5051, and each slot 50151 includes an application ID 5052, transmission data 5053, and reception data 5054. The application ID 5052 indicates an application associated with the slot 5051. The transmission data 5053 is data to be transmitted to another game apparatus 10 in the "passing communication". The reception data 5054 is data received from another game apparatus 10 in the "passing communication".

Figure 14:
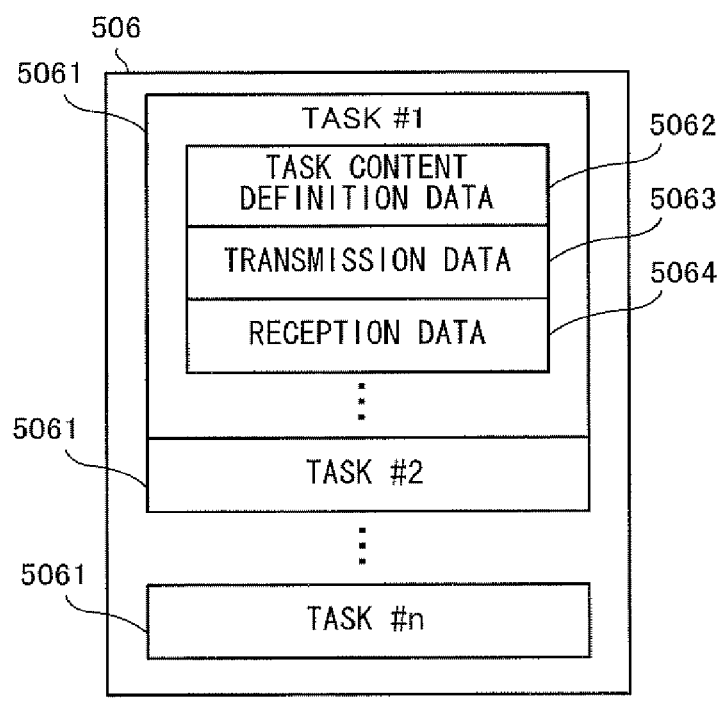
FIG. 14 is a diagram illustrating an example of a data structure of "unnoticed communication" data 506.

Referring back to FIG. 9, the "unnoticed communication" data 506 is used in the "unnoticed communication". FIG. 14 is a diagram illustrating an example of a data structure of the "unnoticed communication" data 506. The "unnoticed communication" data 506 consists of a set of tasks 5061. Each task 5061 includes task content definition data 5062, transmission data 5063, reception data 5064, and the like. The task content definition data 5062 defines an operation content of the task. For example, the task content definition data 5062 includes data (not shown) indicating a next execution time that is a time to execute the task the next time. In addition, the task content definition data 5062 also includes information indicating an application corresponding to the task and information indicating the number of times the task has been executed, an execution priority, and the like. The transmission data 5063 is data to be transmitted to a predetermined server in the task. The reception data 5064 is data received from the predetermined server in the task.

Referring back to FIG. 9, the application counter 507 is data used for controlling an instruction to stop the background communication which instruction is issued from an application as described above. One application counter 507 is allocated to one application being executed. Each application counter 507 includes a first stop counter 508 and a second stop counter 509. The first stop counter 508 is used when it is desired to stop the "passing communication". In the process of each application, when an instruction to stop the "passing communication" is issued, the value of the counter is increased. The second stop counter 509 is used when it is desired to stop the "unnoticed communication". In the process of each application, when an instruction to stop the "unnoticed communication" is issued, the value of the counter is increased. When each application is executed, a plurality of functional modules constituting the application can be internally executed in parallel. The above stop instruction can be issued from each functional module, and thus the stop instructions are issued from a plurality of functional modules in one application in some cases. In such cases, the value of the counter can be two or more.

The game apparatus counter 510 is data used for controlling an instruction to stop the background communication, and includes a third stop counter 511 and a fourth stop counter 512. The third stop counter 511 indicates the sum of the values of the first stop counters 508 of a plurality of the application counters 507, namely, the total number of instructions to stop the "passing communication". The fourth stop counter 512 indicates the sum of the values of the second stop counters 509 of a plurality of the application counters 507, namely, the total number of instructions to stop the "unnoticed communication". For example, when a plurality of applications is being executed, if even one of these applications issues an instruction to stop the "passing communication", the process concerning the "passing communication" is stopped.

In the system data area 504, various pieces of data required for system control, such as operation data, are stored.

In the application data area 513, data used in each application is stored as appropriate. For example, if the content of an application is a versus game, various pieces of data used in the versus game process are stored in the application data area 513 as appropriate.

Next, the above-described processes performed by the game apparatus 10 will be described in detail. First, the process performed by the first microcomputer 37 will be described.

(Process Performed by First Microcomputer 37)

Figure 15:
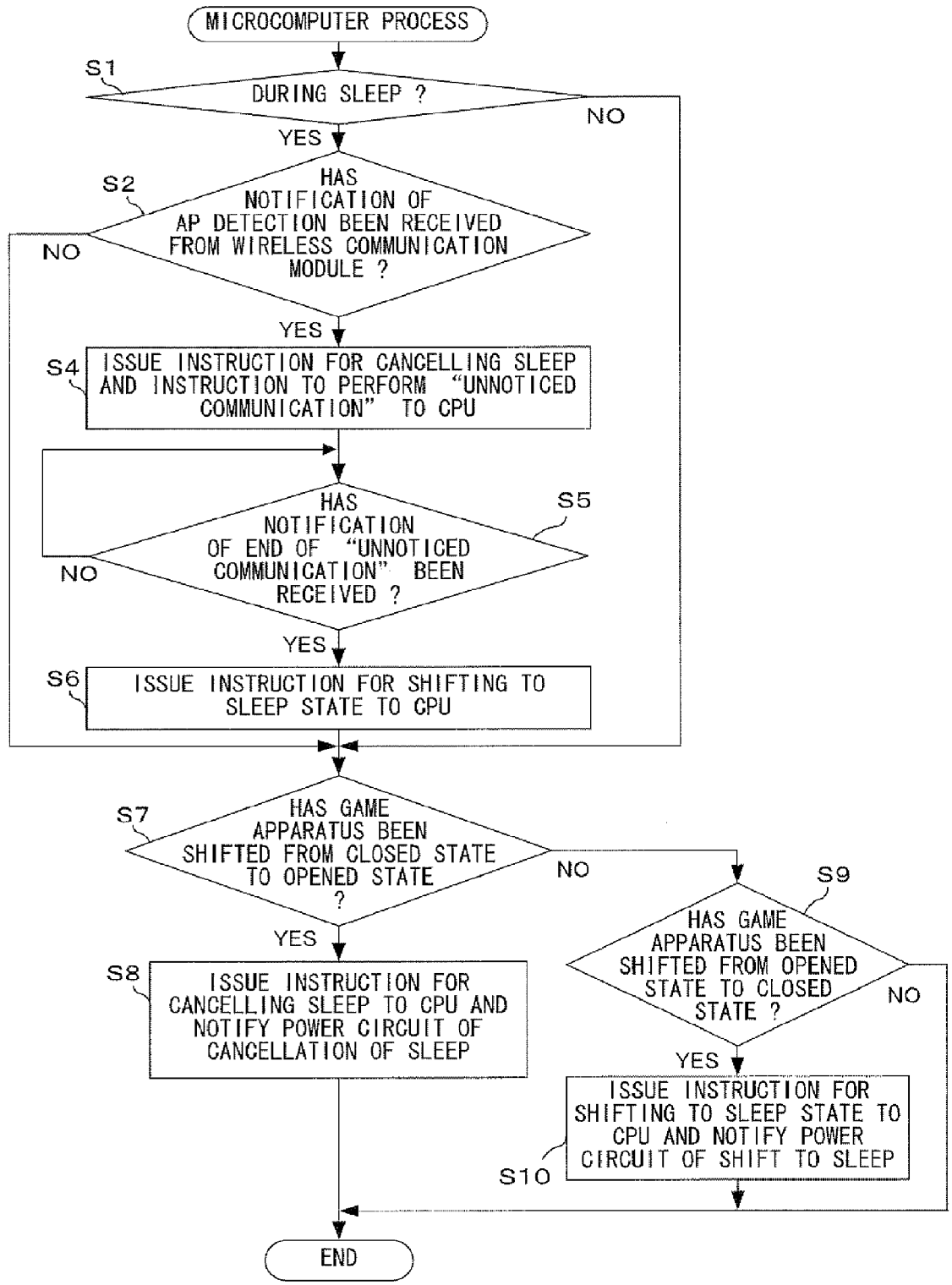
FIG. 15 is a flowchart illustrating a microcomputer process performed by the first microcomputer 37.

FIG. 15 is a flowchart illustrating the microcomputer process performed by the first microcomputer 37. The process shown in FIG. 15 is performed as a background process repeatedly in predetermined cycles, unless the power of the game apparatus 10 is completely turned off.

In FIG. 15, at step S1, it is determined whether or not the game apparatus 10 is in the "sleep mode". Specifically, by referring to the power supply state flag 304, it is determined whether or not the game apparatus 10 is in the "sleep mode". As a result of the determination, when the game apparatus 10 is not in the "sleep mode" (NO at step S1), the processing proceeds to below-described step S7. On the other hand, when the game apparatus 10 is in the "sleep mode" (YES at step S1), it is determined at step S2 whether or not a notification that an AP is detected, which notification is issued from (the second microcomputer 361 of) the wireless communication module 36, has been received (the notification is issued at below-described step S24 in FIG. 16). As a result of the determination, when the notification that an AP is detected has not been issued from the wireless communication module 36 (NO at step S2), the processing proceeds to below-described step S7. On the other hand, when the notification that an AP is detected has been issued from the wireless communication module 36 (YES at step S2), at step S4, an instruction to cancel the "sleep mode" and shift to the "normal power mode" is issued from the first microcomputer 37 to the CPU 311, the power supply state flag 304 is set to ON, and a notification that the "sleep mode" is to be cancelled is issued from the first microcomputer 37 to the power circuit 40. Further, an instruction to perform the "unnoticed communication" is also issued to the CPU 311.

Thereafter, power is temporarily supplied to the CPU 311 such that the CPU 311 becomes operable, and the CPU 311 performs the process concerning the "unnoticed communication" as described below. Then, when the process is finished, a notification that the "unnoticed communication" has ended is transmitted from the CPU 311 to the first microcomputer 37.

Next, at step S5, it is determined whether or not the notification that the "unnoticed communication" has ended has been received. As a result, when the notification has not been received (NO at step S5), the determination at step S5 is repeated (i.e., the first microcomputer 37 waits until the "unnoticed communication" ends). On the other hand, when the notification has been received (YES at step S5), at step S6, an instruction to shift to the "sleep mode" is issued from the first microcomputer 37 to the CPU 311, the power supply state flag 304 is set to OFF, and a notification that the "sleep mode" is to be shifted to is issued from the first microcomputer 37 to the power circuit 40. It should be noted that the issuance of the instruction to cancel the "sleep mode" and shift to the "normal power mode" at step S4, the determination at step S5, and the issuance of the instruction to shift to the "sleep mode" at step S6 may be performed by the second microcomputer 361 of the wireless communication module 36, not by the first microcomputer 37.

Next, at step S7, it is determined whether or not the game apparatus 10 has been shifted from a closed state (a state in which the housing is closed) to an opened state (a state in which the housing is opened) (i.e., whether or not the game apparatus 10 has been opened). Specifically, the first microcomputer 37 determines whether or not a detection signal indicating that the housing is opened has been received from the open/close detector 46. As a result of the determination, when it is determined that the game apparatus 10 has been shifted from the closed state to the opened state (YES at step S7), at the next step S8, an instruction to cancel the "sleep mode" is issued from the first microcomputer 37 to the CPU 311, the power supply state flag 304 is set to ON, and a notification that the "sleep mode" is to be cancelled is issued from the first microcomputer 37 to the power circuit 40. Accordingly, the power circuit 40 starts power supply to each component of the game apparatus 10 as appropriate.

On the other hand, as a result of the determination at step S7, when it is determined that the game apparatus 10 has not been shifted from the closed state to the opened state (NO at step S7), it is determined at the next step S9, on the basis of a signal from the open/close detector 46, whether or not the game apparatus 10 has been shifted from the opened state to the closed state (i.e., whether or not the game apparatus 10 has been closed). As a result, when it is determined that the game apparatus 10 has been shifted from the opened state to the closed state (YES at step S9), at the next step S10, an instruction to shift to the "sleep mode" is issued from the first microcomputer 37 to the CPU 311, the power supply state flag 304 is set to OFF, and a notification that the "sleep mode" is to be shifted to is issued from the first microcomputer 37 to the power circuit 40. Accordingly, the power circuit 40 stops power supply to the components of the game apparatus 10 other than some components, as appropriate.

On the other hand, as a result of the determination at step S9, when it is determined that the game apparatus 10 has not been shifted from the opened state to the closed state (NO at step S9), the process at step S10 is skipped and the microcomputer process ends.

(Process Performed by Second Microcomputer 361 in "Sleep Mode")

Figure 16:
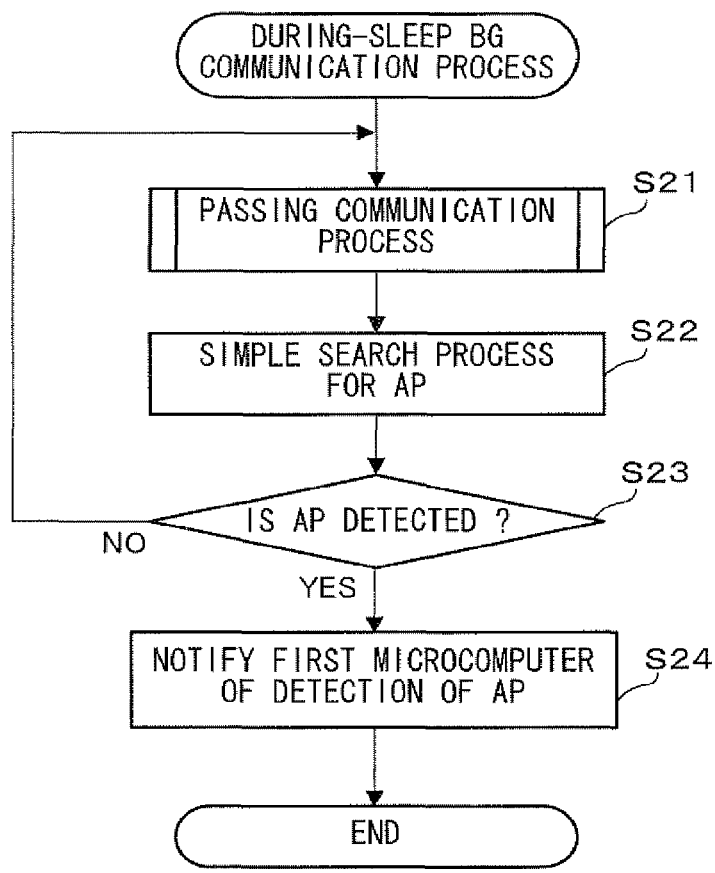
FIG. 16 is a flowchart illustrating a during-sleep BG communication process performed by a second microcomputer 361.
Figure 17:
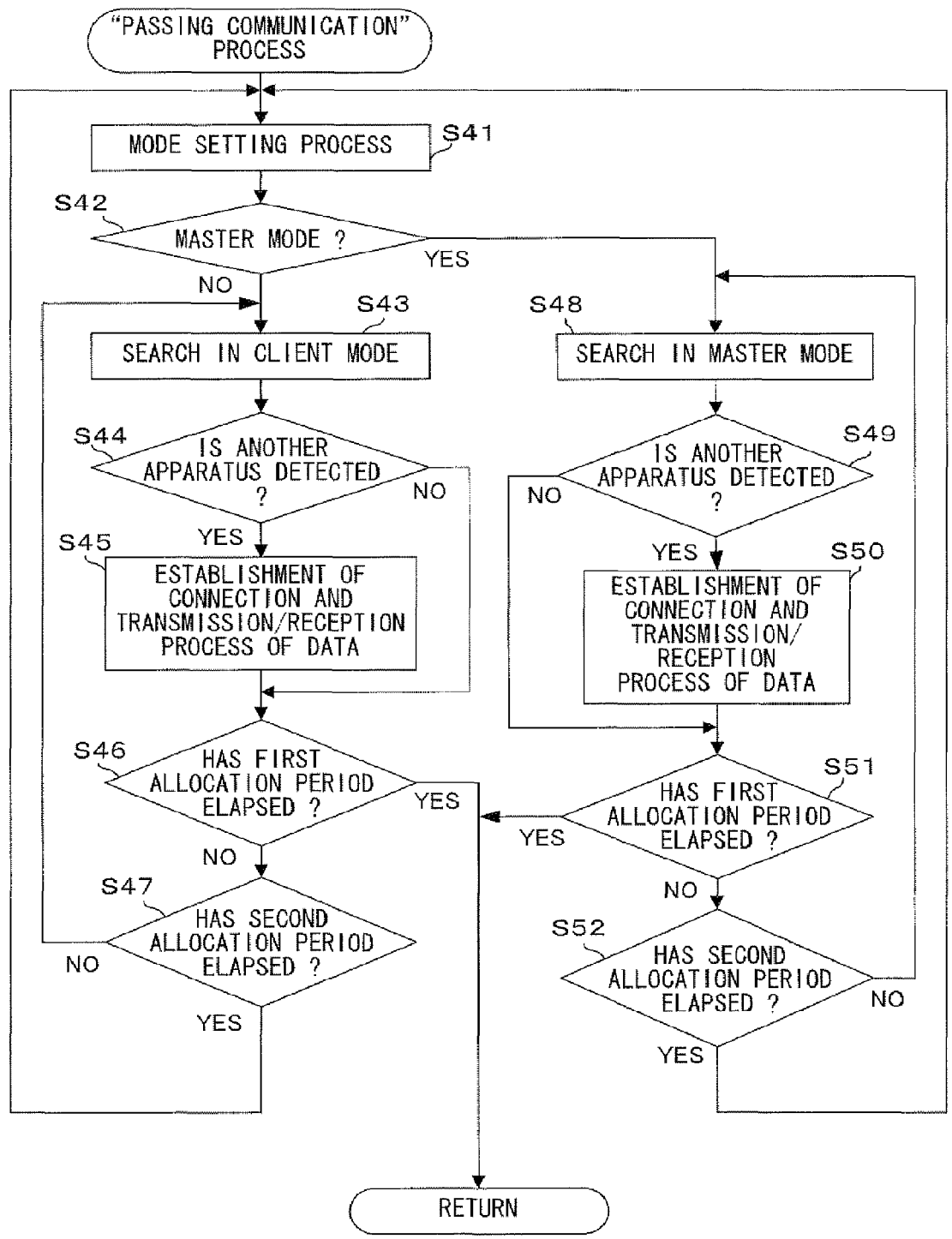
FIG. 17 is a flowchart illustrating details of a passing communication process at step S21 in FIG. 16.

Next, the during-sleep BG communication process performed by the second microcomputer 361 in the "sleep mode" will be described with reference to FIG. 16. First, at step S21, a passing communication process is performed. This process is a process for repeating the search process for the "passing communication" during the first allocation period (30 seconds in the present embodiment) as described above and performing the "passing communication" with another game apparatus 10 if possible. FIG. 17 is a flowchart illustrating details of the passing communication process. In FIG. 17, first, at step S41, a mode setting process is performed. This process is a process for performing setting of the client mode and the master mode in the "passing communication" as described above. In this process, it is determined whether the game apparatus 10 operates in the "client mode" or the "master mode". In other words, by step S41 being repeatedly executed, it is repeatedly set whether the game apparatus 10 operates in the "client mode" or the "master mode".

Next, at step S42, as a result of the process at step S41, it is determined whether or not the game apparatus 10 is determined to operate in the "master mode". As a result, when the game apparatus 10 does not operate in the "master mode", namely, operates in the "client mode" (NO at step S42), a search process in the "client mode" is performed at step S43. In other words, a process of transmitting a beacon indicative of requesting another game apparatus to connect to the game apparatus 10 is performed.

Next, at step S44, it is determined whether or not another game apparatus 10 is detected, by determining whether or not a response to the transmitted beacon has been received. As a result, when another game apparatus 10 is not detected (NO at step S44), the processing proceeds to below-described step S46. On the other hand, when another game apparatus 10 is detected (YES at step S44), the sleep state of the CPU 311 is temporarily cancelled on the basis of a signal from the wireless communication module 36 or the first microcomputer 37, and a connection is established to the detected other game apparatus 10 and the "passing communication" is performed at step S45. In other words, the "passing communication" data 505 is referred to, and transmission/reception of data in slots having the common application ID 5052 is performed. Then, when data exchange in the "passing communication" is finished, the CPU 311 shifts to the sleep state again.

Next, at step S46, it is determined whether or not the first allocation period (in the present embodiment, 30 seconds from start of the search process for the "passing communication") as shown in FIG. 5 has elapsed. As a result, when the first allocation period has elapsed (YES at step S46), the passing communication process ends. On the other hand, when the first allocation period has not elapsed (NO at step S46), it is determined at the next step S47 whether or not the second allocation period (in the present embodiment, 1 second from end of setting of an operating mode) has elapsed. As a result, when the second allocation period has not elapsed (NO at step S47), the processing returns to step S43, and the search process in the "client mode" is repeated. On the other hand, when the second allocation period has elapsed (YES at step S47), the processing returns to step S41, and the same process is repeated starting with the mode setting process. In other words, it is set again whether the game apparatus 10 operates in the "client mode" or the "master mode".

Next, as a result of the determination at step S42, when the game apparatus 10 operates in the "master mode" (YES at step S42), a search process in the "master mode" is performed at step S48. In other words, reception of (waiting for) a beacon transmitted from another game apparatus 10 operating in the "client mode" is performed.

Next, at step S49, it is determined whether or not another game apparatus 10 is detected, by determining whether or not a beacon has been received from the other game apparatus 10 (within a predetermined time period). As a result, when another game apparatus 10 is not detected (NO at step S49), the processing proceeds to below-described step S51. On the other hand, when another game apparatus 10 is detected (YES at step S49), the sleep state of the CPU 311 is temporarily cancelled on the basis of a signal from the wireless communication module 36 or the first microcomputer 37, and a connection is established to the detected other game apparatus 10 and the "passing communication" is performed at step S50, similarly to step S45. Then, when data exchange in the "passing communication" is finished, the CPU 311 shifts to the sleep state again.

Next, at step S51, it is determined whether or not the first allocation period has elapsed. As a result, when the first allocation period has elapsed (YES at step S51), the passing communication process ends. On the other hand, when the first allocation period has not elapsed (NO at step S51), it is determined at the next step S52 whether or not the second allocation period has elapsed. As a result, when the second allocation period has not elapsed (NO at step S52), the processing returns to step S48, and the search process in the "master mode" is repeated. On the other hand, when the second allocation period has elapsed (YES at step S52), the processing returns to step S41, and the same process is repeated starting with the mode setting process. In other words, it is set again whether the game apparatus 10 operates in the "client mode" or the "master mode". This is the end of the description of the passing communication process.

Referring back to FIG. 16, when the passing communication process ends, a search process for the "unnoticed communication" is performed next. Specifically, first, at step S22, a simple search process for an AP is performed. In the search process performed here, a search for an AP is performed by passive scan. In addition, since the second microcomputer 361 performs this process, a search process involving complicated processes (requiring an operation performed by the CPU 311) is not performed, and a search process that is a relatively simple process is performed.

Next, at step S23, it is determined whether or not an AP is detected as a result of the search process. As a result, when no AP is detected (NO at step S23), the processing returns to step S21, and the same process is repeated. On the other hand, when an AP is detected (YES at step S23), a notification that the AP is detected is transmitted to the first microcomputer 37 at step S24 (this notification is used for the determination at step S2 in the microcomputer process in FIG. 15). As a result, the sleep state of the CPU 311 is temporarily cancelled on the basis of a signal from the first microcomputer 37, and an "unnoticed communication" process described below is performed. In this case, with regard to the program stored in the RAM 362 of the wireless communication module 36, the during-sleep BG communication process program 5021 is replaced with the "infrastructure communication" program 5024. Thus, the during-sleep BG communication process actually ends here. Then, when the "unnoticed communication" ends and the CPU 311 shifts to the sleep state again, the during-sleep BG communication process program 5021 is stored in the RAM 362 of the wireless communication module 36, and the same process is performed from step S21. This is the end of the description of the during-sleep BG communication process.

(Process Performed by CPU 311 in "Normal Power Mode")

Next, a process performed by the CPU 311 mainly in the "normal power mode" will be described. First, a management process performed (made resident and performed) as a background process in the "normal power mode" will be described. This process is also a process performed initially when power is supplied to the CPU 311.

(Management Process)

Figure 18:
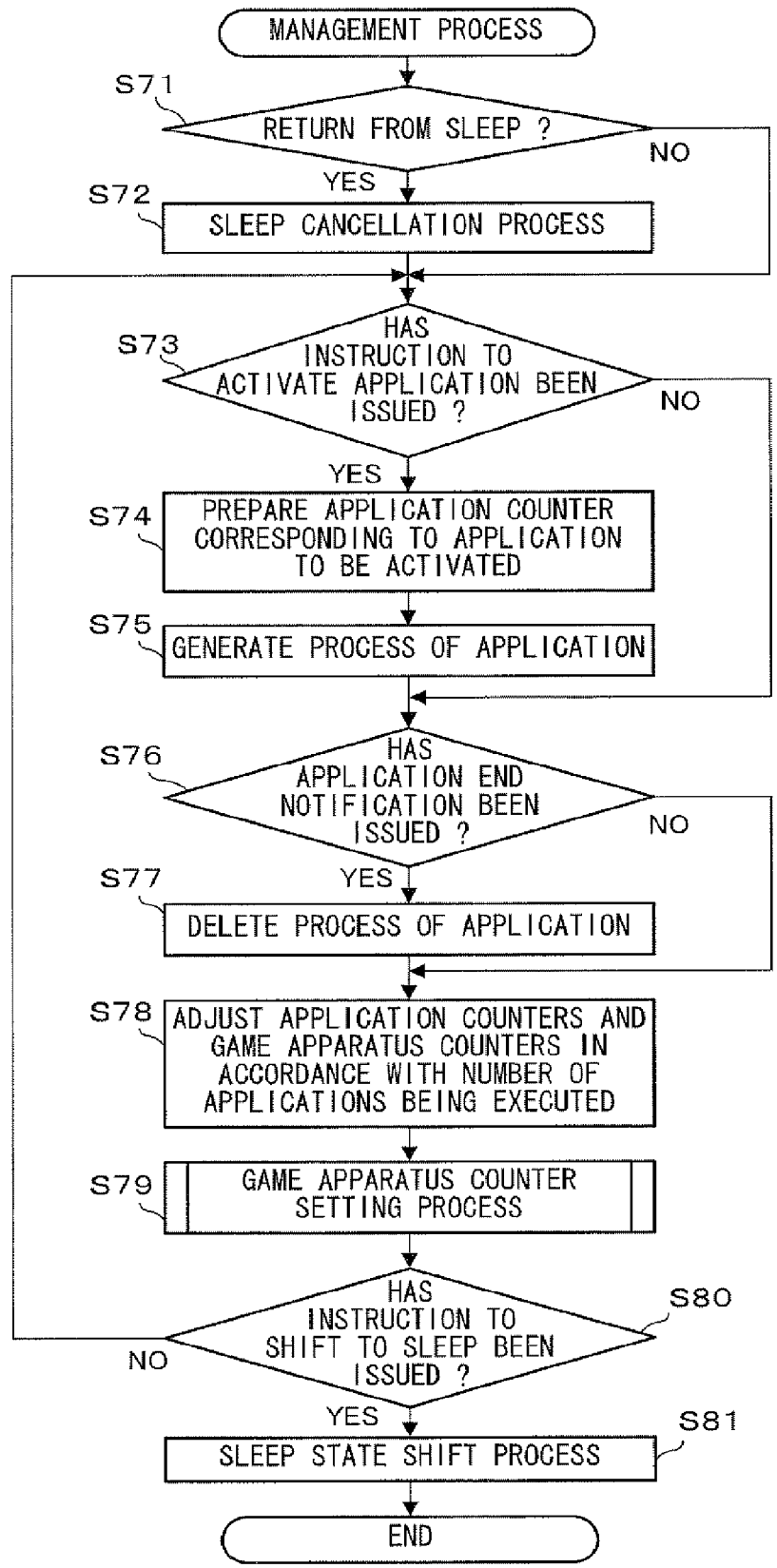
FIG. 18 is a flowchart illustrating details of a management process.

FIG. 18 is a flowchart illustrating details of the management process. First, at step S71, it is determined whether or not the CPU 311 is in a state where the CPU 311 has received a sleep cancellation instruction from the first microcomputer 37 and has just returned from the "sleep mode". As a result, when the CPU 311 is in the state of having just returned from the "sleep mode" (YES at step S71), a sleep cancellation process is performed at step S72. This process is a process for preparation for the game apparatus 10 to operate in the "normal power mode". For example, a process of restarting an application process being stopped due to the shift to the "sleep mode" is performed. Start of a normal time BG communication process described below is also instructed. On the other hand, as a result of the determination at step S71, when the CPU 311 is not in the state of having just returned from the "sleep mode" (NO at step S71), the process at step S72 is skipped.

Next, at step S73, it is determined whether or not an instruction to activate a predetermined application has been issued. For example, in a state where a home menu (not shown) of the game apparatus 10 is displayed, when an icon indicating a predetermined application is selected by the user, an instruction to activate the selected application is issued from an application that controls the home menu. As a result of the determination, when it is determined that an instruction to activate an application occurs (YES at step S73), an application counter 507 associated with the application instructed to be activated is generated and stored in the main memory 32 at step S74. Then, at step S75, a process of the application instructed to be activated is generated, whereby the application is activated.

On the other hand, as a result of the determination at step S73, when an instruction to activate an application has not been issued, the processes at steps S74 and S75 are skipped.

Figure 22:
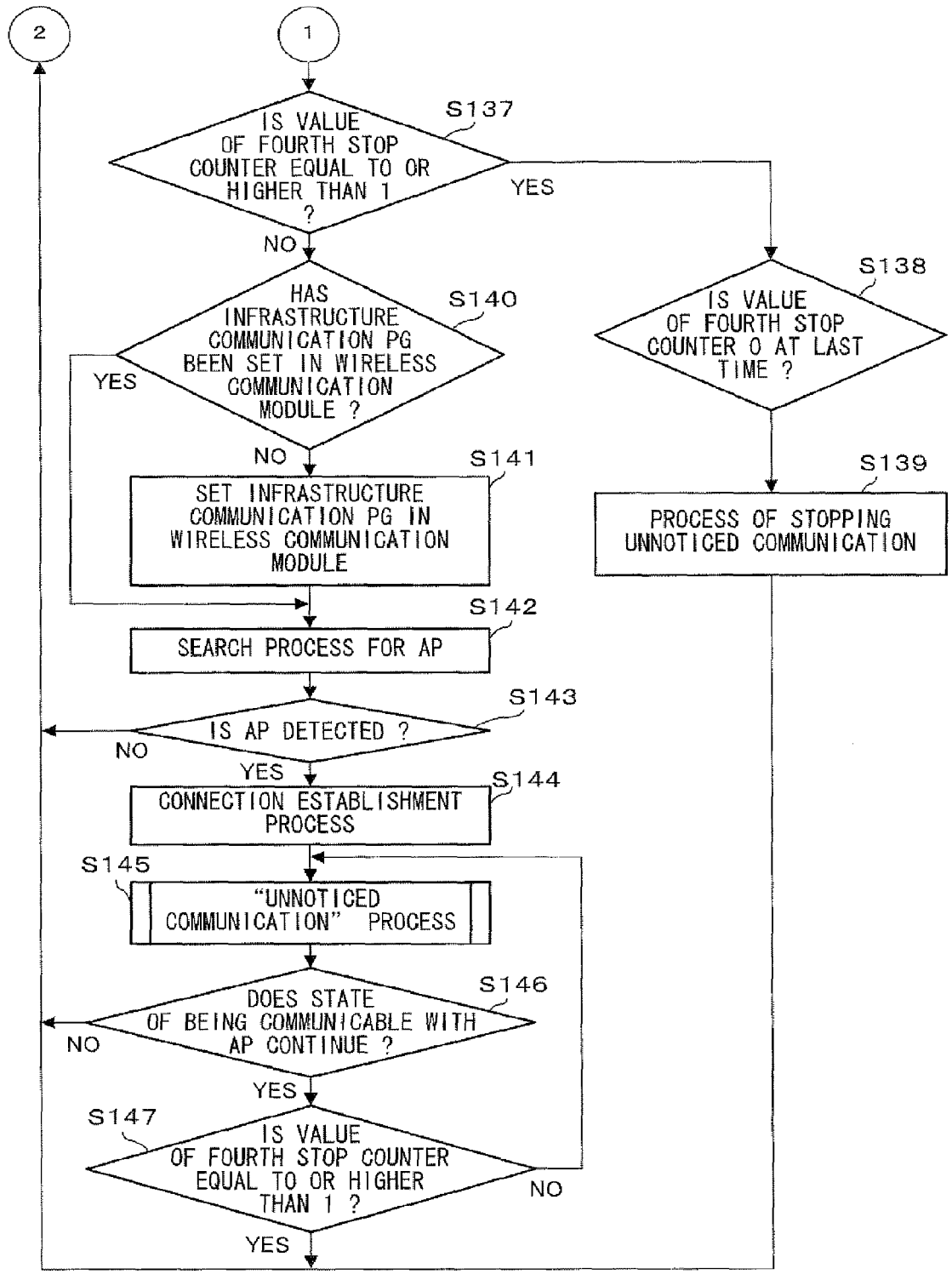
FIG. 22 is a flowchart illustrating details of the normal time BG communication process.

Next, at step S76, it is determined whether or not an application end notification (issued at below-described step S122 in FIG. 22) has been issued from any one of applications being currently executed. As a result, when the end notification has not been issued (NO at step S76), the processing proceeds to below-described step S78. On the other hand, when the end notification has been issued (YES at step S76), a process of deleting the process of the application that has issued the notification is performed at step S77.

Next, at step S78, a process for adjusting the number of the application counters 507 in accordance with the number of the applications being currently executed is performed. Specifically, it is checked whether there is any application counter 507 of which a process of the corresponding application is not present, and when such an application counter 507 remains, a process of deleting the application counter 507 is performed. For example, this process is a process for, when an application is force-quitted or abends due to a certain reason, preventing the application counter 507 corresponding to the application from remaining. In addition, when there is an application counter 507 to be deleted, it is checked whether or not the value of each of the first stop counter 508 and the second stop counter 509 of this application counter 507 is equal to or higher than 1. When there is a counter whose value is equal to or higher than 1, a process of decreasing the value of the game apparatus counter 510 as appropriate is also performed. Specifically, when the value of the first stop counter 508 of the application counter 507 to be deleted is equal to or higher than 1, 1 is subtracted from the value of the third stop counter 511. When the value of the second stop counter 509 is equal to or higher than 1, 1 is subtracted from the value of the fourth stop counter 512. When there are two or more application counters 507 to be deleted, the above determination is performed for each application counter 507. For example, when there are three application counters 507 to be deleted and there are two application counters 507 each of which the value of the first stop counter 508 is equal to or higher than 1, 2 is subtracted from the value of the third stop counter 511.

Figure 19:
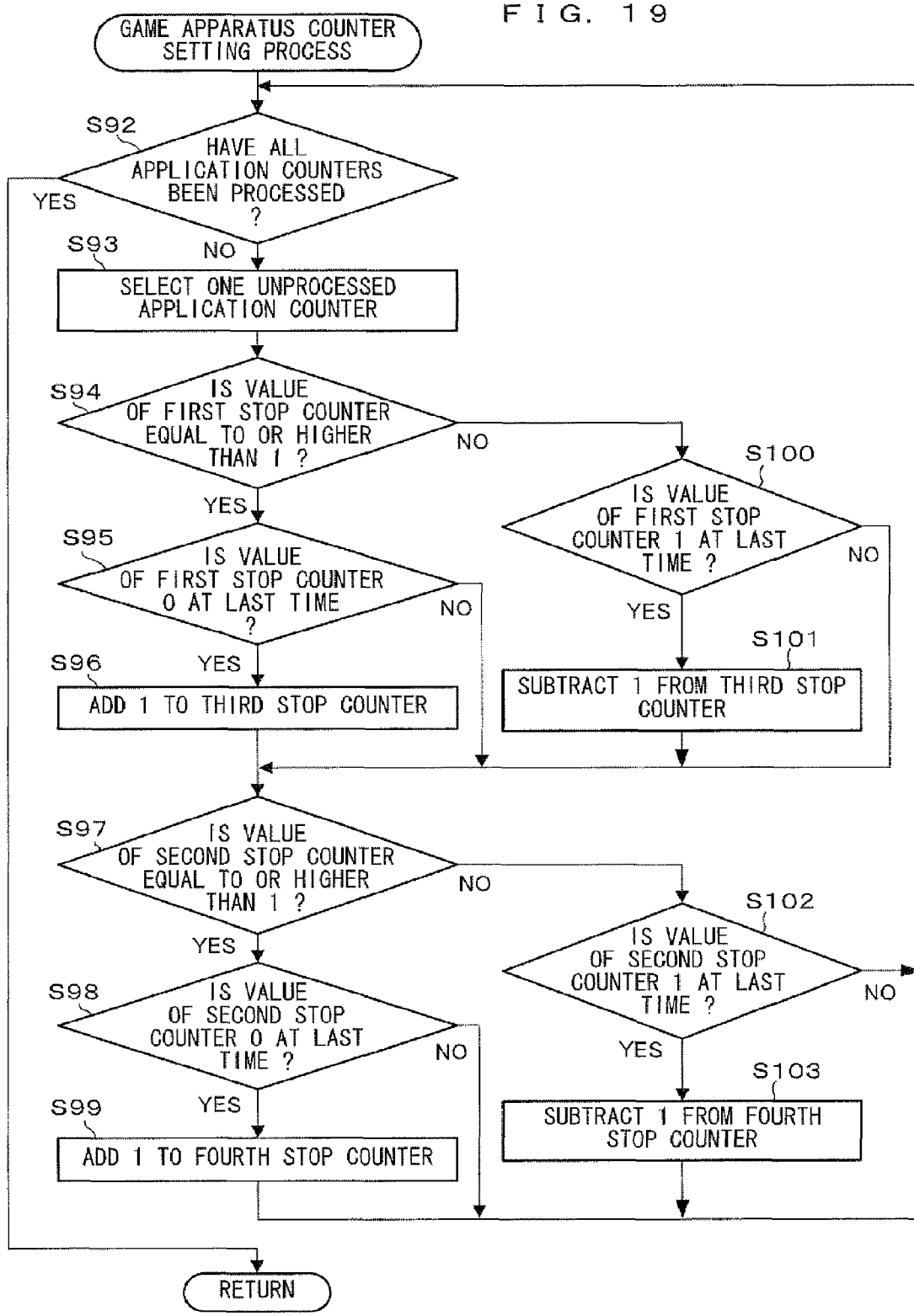
FIG. 19 is a flowchart illustrating details of a game apparatus counter setting process in FIG. 18.

Next, at step S79, a game apparatus counter setting process is performed. This process is a process of checking the state of each application counter 507 at this time point and setting the game apparatus counter 510 in accordance with the content of each application counter 507. FIG. 19 is a flowchart illustrating details of this process.

First, at step S92, it is determined whether or not a process described next has been performed for all the application counters 507 in the system data area 504. As a result, when any unprocessed application counters 507 remain (NO at step S92), one counter is selected from the unprocessed application counters 507 at step S93. Hereinafter, the selected application counter 507 is referred to as process target application counter.

Next, at step S94, it is determined whether or not the value of the first stop counter 508 of the process target application counter is equal to or higher than 1. In other words, it is determined whether or not the application corresponding to the process target application counter has instructed to stop a process concerning the "passing communication". As a result of the determination, when the value of the first stop counter 508 is equal to higher than 1 (YES at step S94), it is determined at step S95 whether or not the value of the first stop counter 508 of the process target application counter is 0 in the last process loop (i.e., whether a stop instruction is newly issued at this time or has been previously issued). As a result, when the value is 0 at the last time (YES at step S95), it means that the stop instruction is newly issued at this time, and thus 1 is added to the value of the third stop counter 511 of the game apparatus counter 510 at step S96. On the other hand, when the value is not 0 (NO at step S95), it means that the stop instruction has been previously issued, and thus the process at step S96 is skipped. On the other hand, as a result of the determination at step S94, when the value of the first stop counter 508 is not equal to or higher than 1, namely, is 0 (NO at step S94), it is determined at step S100 whether or not the value of the first stop counter 508 of the process target application counter is equal to or higher than 1 in the last process loop (i.e., whether or not a stop cancellation instruction is newly issued at this time). As a result, when the value is equal to or higher than 1 (YES at step S100), it means that the stop cancellation instruction is newly issued at this time, and thus 1 is subtracted from the value of the third stop counter 511 at step S101 (it should be noted that this subtraction is not performed when the value of the third stop counter 511 is already 0 as a result of the game apparatus counter 510 being adjusted due to the force-quit of the application or the like in the process at step S78 in FIG. 18). Then, the processing proceeds to below-descried step S97. On the other hand, when the value of the first stop counter 508 is not equal to or higher than 1 (NO at step S100), it means that the stop cancellation instruction has been previously issued, and thus the process at step S101 is skipped.

Next, at step S97, it is determined whether or not the value of the second stop counter 509 of the process target application counter is equal to or higher than 1. In other words, it is determined whether or not the application corresponding to the process target application counter has instructed to stop the process concerning the "unnoticed communication". As a result of the determination, when the value of the second stop counter 509 is equal to or higher than 1 (YES at step S97), it is determined at step S98 whether or not the value of the second stop counter 509 of the process target application counter is 0 in the last process loop. As a result, when the value is 0 at the last time (YES at step S98), 1 is added to the value of the fourth stop counter 512 of the game apparatus counter 510 at step S99. Then, the processing returns to step S92, and the same process is repeated. On the other hand, when the value is not 0 (NO at step S98), the process at step S99 is skipped. On the other hand, as a result of the determination at step S97, when the value of the second stop counter 509 is not equal to or higher than 1, namely, is 0 (NO at step S97), it is determined at step S102 whether or not the value of the second stop counter 509 of the process target application counter is equal to or higher than 1 in the last process loop. As a result, when the value is equal to or higher than 1 (YES at step S102), 1 is subtracted from the value of the fourth stop counter 512 at step S103 (it should be noted that this subtraction is not performed when the value of the fourth stop counter 512 is already 0 in the process at step S78). Then, the processing returns to step S92. On the other hand, when the value of the second stop counter 509 is not equal to or higher than 1 (NO at step S102), the process at step S103 is skipped and the processing returns to step S92.

By the processes as described above, a stop instruction or a stop cancellation instruction from an application can be reflected in the value of the game apparatus counter 510. In other words, when a stop instruction is issued from an application, the value of the game apparatus counter 510 is increased. Then, when cancellation of the stop instruction is instructed, the value of the game apparatus counter 510 is decreased.

On the other hand, as a result of the determination at step S92, when it is determined that the above-described process has been performed for all the application counters 507 in the system data area 504 (YES at step S92), the game apparatus counter setting process ends.

Referring back to FIG. 18, at the next step S80, it is determined whether or not an instruction to shift to the "sleep mode" has been issued from the first microcomputer 37. As a result, when the instruction has not been issued (NO at step S80), the processing returns to step S73, and the same process is repeated. On the other hand, when the instruction has been issued (YES at step S80), a sleep state shift process is performed at step S81. Specifically, when the process of the "passing communication" or the "unnoticed communication" is being performed at this time point, this process is stopped. Further, the during-sleep BG communication process program 5021 is copied into the RAM 362 of the wireless communication module 36. Thus, in the "sleep mode", the wireless communication module 36 can perform the during-sleep BG communication process shown in FIG. 16. As a result, even if an instruction to stop the "passing communication" or the "unnoticed communication" has been issued from a predetermined application as described below, when the game apparatus 10 shifts to the "sleep mode", the application is stopped, and thus the "passing communication" and the "unnoticed communication" can be performed regardless of the instruction (the value of the counter). In addition, various processes for shifting to the "sleep mode", such as stopping applications being executed and storing states of the applications at that moment, are also performed. Then, the management process ends.

(Application Process)

Next, a process of an application activated in accordance with an activation instruction from the user and the management process described above will be described. The application process can be performed as a foreground process and also can be performed as a background process. As a matter of course, a specific process content is different between each application. Thus, the description concerning the difference is omitted, and a part relevant to the present embodiment, namely, a process concerning the application counter 507 will be mainly described as a process content common to each application, namely, as a process that is thought to be performed generally in each application.

Figure 20:
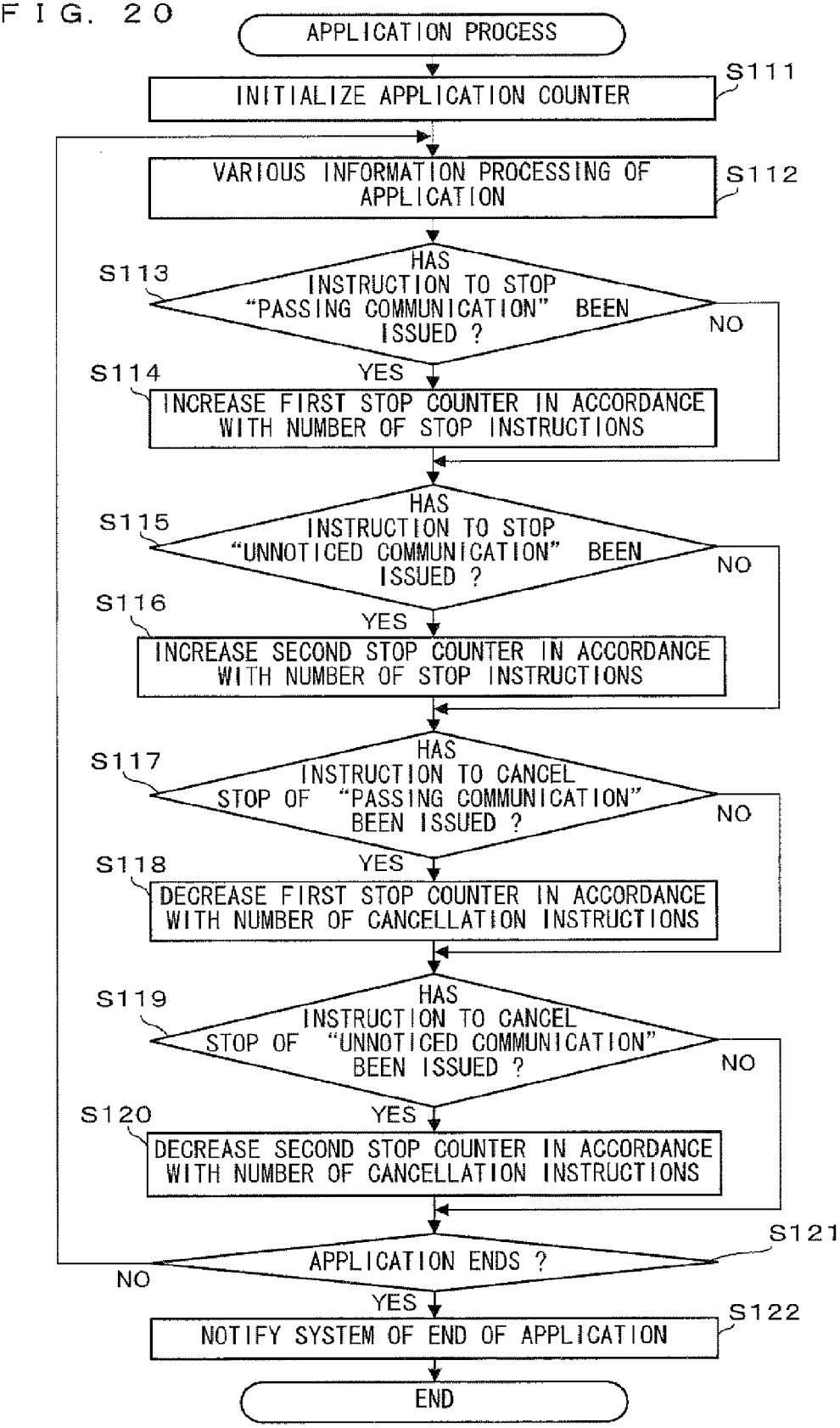
FIG. 20 is a flowchart illustrating details of an application process.

FIG. 20 is a flowchart illustrating details of the application process. First, at step S111, the application counter 507 corresponding to the application is initialized. In other words, the values of the first stop counter 508 and the second stop counter 509 are set to 0.

Next, at step S112, various information processing corresponding to the content of each application is performed. For example, game processing, painting software processing, camera application processing, or the like, is performed. In this processing, a process concerning the "local communication" can be also performed as appropriate. In this case, before the process of the "local communication" is performed, an instruction to stop communication as described below is issued. Then, stop of the process concerning the "passing communication" or the "unnoticed communication" is confirmed, then the "local communication" process program 5023 is copied into the RAM 362 of the wireless communication module 36, and the process concerning the "local communication" is started. As a matter of course, in addition to the case of performing the "local communication", a stop instruction may be issued for the purpose of reducing the processing load. In such a case, the application does not necessarily need to wait until stop of communication is confirmed.

Next, at step S113, it is determined whether or not an instruction to stop the "passing communication" has been issued as a result of the above various information processing. Here, in the present embodiment, it is assumed that each application consists of a set of programs each having a specific function. It is also assumed that the stop instruction can be issued by each program constituting the application. Thus, in some cases, the stop instruction is issued from two programs among the program group constituting the application. In such cases, there are two stop instructions.

As a result of the determination at step S113, when one or more instructions to stop the "passing communication" have been issued (YES at step S113), the value of the first stop counter 508 is increased in accordance with the number of the issued stop instructions at step S114. On the other hand, when no stop instruction has been issued (NO at step S113), the process at step S114 is skipped.

Next, at step S115, it is determined whether or not an instruction to stop the "unnoticed communication" has been issued as a result of the various information processing at step S112. This stop instruction also can be issued by each program constituting the application, similarly to the case of the "passing communication". As a result of the determination, when one or more instructions to stop the "unnoticed communication" have been issued (YES at step S115), the value of the second stop counter 509 is increased in accordance with the number of the issued stop instructions at step S116. On the other hand, when no stop instruction has been issued (NO at step S115), the process at step S116 is skipped.

Next, at step S117, it is determined whether or not an instruction to cancel stop of the "passing communication" has been issued as a result of the various information processing at step S112. For example, when a predetermined process ends and it is not necessary to stop the "passing communication" after a program issues an instruction to stop the "passing communication", an instruction to cancel the stop is issued from this program. As a result of the determination, when one or more instructions to cancel stop of the "passing communication" have been issued (YES at step S117), the value of the first stop counter 508 is decreased in accordance with the number of the issued cancellation instructions at step S118. On the other hand, when no cancellation instruction has been issued (NO at step S117), the process at step S118 is skipped.

Next, at step S119, it is determined whether or not an instruction to cancel stop of the "unnoticed communication" has been issued as a result of the various information processing at step S112. As a result of the determination, when one or more instructions to cancel stop of the "unnoticed communication" have been issued (YES at step S119), the value of the second stop counter 509 is decreased in accordance with the number of the issued cancellation instructions at step S120. On the other hand, when no cancellation instruction has been issued (NO at step S119), the process at step S120 is skipped.

Next, at step S121, it is determined whether or not an instruction to end the application has been issued. As a result, when the instruction to end the application has not been issued (NO at step S121), the processing returns to step S112, and the same process is repeated. On the other hand, when the instruction to end the application has been issued (YES at step S121), a process of notifying the system of end of the application is performed at step S122. In accordance with the notification, a process of deleting the process of the application and the like is performed on the system side as appropriate. Then, the application process ends.

(Normal Time BG Communication Process)

Next, the normal time BG communication process performed as a background process in the "normal power mode" will be described. This process is a process for performing the "passing communication" or the "unnoticed communication" in the background in the "normal power mode".

Figure 21:
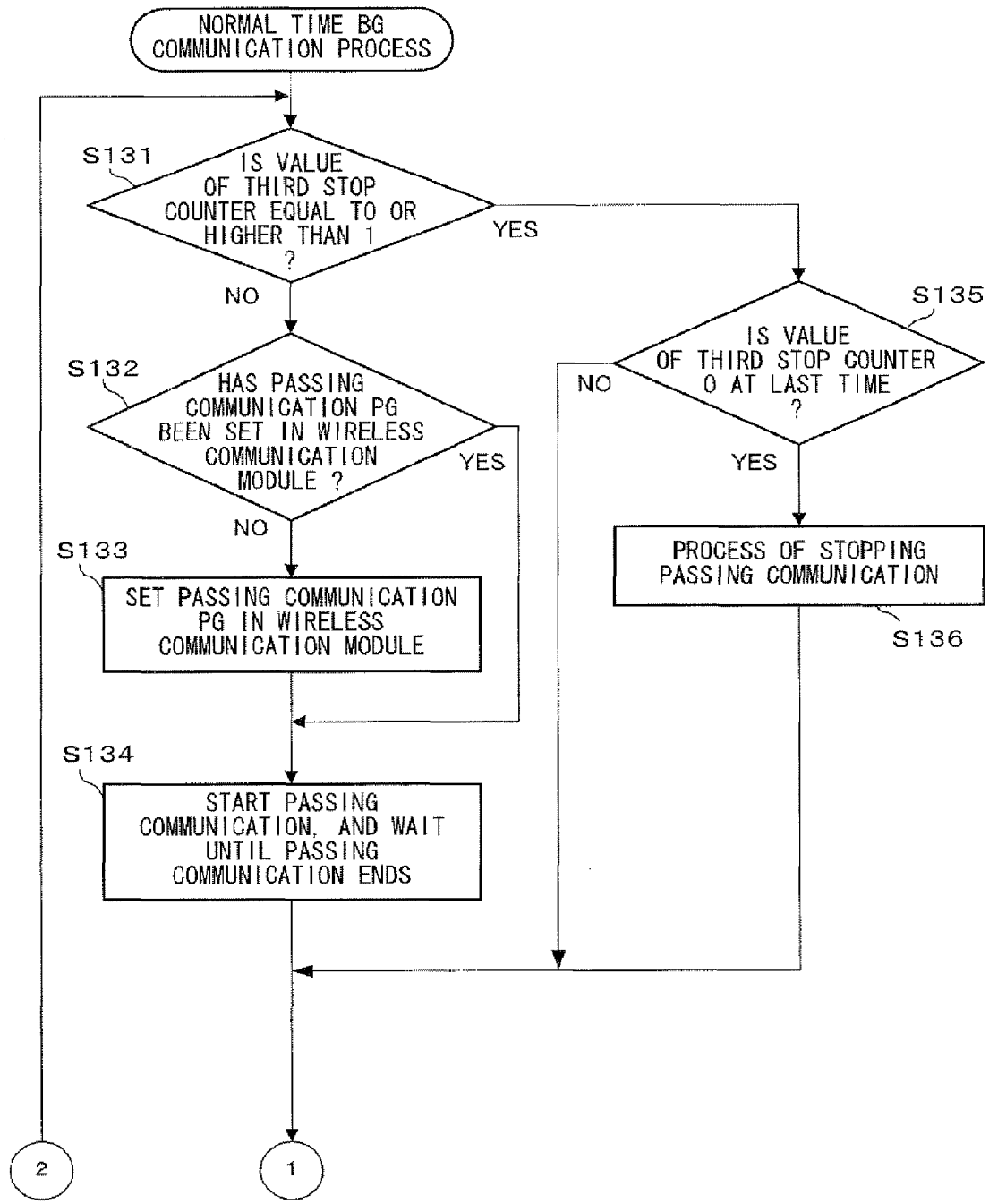
FIG. 21 is a flowchart illustrating details of a normal time BG communication process.

FIG. 21 is a flowchart illustrating details of the normal time BG communication process. First, at step S131, the game apparatus counter 510 is referred to, and it is determined whether or not the value of the third stop counter 511 is equal to or higher than 1. In other words, it is determined whether or not the number of applications that desire to stop the process concerning the "passing communication" is equal to or higher than 1. As a result of the determination, when the number is equal to or higher than 1 (YES at step S131), at least one application that has issued an instruction to stop the "passing communication" is present. In this case, next, at step S135, it is determined whether or not the value of the third stop counter 511 is 0 in the last process loop. As a result, when the value is 0 at the last time (YES at step S135), a process for stopping the process concerning the "passing communication" is performed at step S136. Specifically, a process of instructing the second microcomputer 361 of the wireless communication module 36 to stop the "passing communication" process being performed and the like is performed (when the "passing communication" is not being performed at this time point, the process at step S136 may be skipped). Then, the processing proceeds to below-described step S137.

On the other hand, as a result of the determination at step S131, when the value of the third stop counter 511 is not equal to or higher than 1, namely, is 0 (NO at step S131), there is no application that desires to stop the process concerning the "passing communication". In this case, next, at step S132, it is determined whether or not the "passing communication" process program 5022 is stored in the RAM 362 of the wireless communication module 36 (e.g., when the value of the third stop counter 511 is 0 and the value of the fourth stop counter 512 is equal to or higher than 1, the "passing communication" process program 5022 remains stored in the RAM 362 of the wireless communication module 36). As a result, when the "passing communication" process program 5022 is not stored in the RAM 362 (NO at step S132), the "passing communication" process program 5022 is copied into the RAM 362 of the wireless communication module 36 at step S133. On the other hand, as a result of the determination at step S132, when the "passing communication" process program 5022 has been already stored in the RAM 362 (YES at step S132), the process at step S133 is skipped.

Next, at step S134, an instruction to perform the "passing communication" process is issued to the second microcomputer 361. In accordance with the instruction, the second microcomputer 361 starts the "passing communication" process (as a result, the "passing communication" is performed in the background). The "passing communication" process is the same as the process described with reference to FIG. 17, and thus the description thereof is omitted. Further, when the passing communication process is started, a process of waiting until its end is also performed. In the present embodiment, the CPU 311 waits for at least 30 seconds (the first allocation period).

Next, at step S137, it is determined whether or not the value of the fourth stop counter 512 is equal to or higher than 1. In other words, it is determined whether or not there is any application that desires to stop the process concerning the "unnoticed communication". As a result, when the value is equal to or higher than 1 (YES at step S137), an instruction to stop the "unnoticed communication" has been issued. In this case, it is determined whether or not the value of the fourth stop counter 512 is 0 in the last process loop. As a result, when the value is 0 at the last time (YES at step S138), a process for stopping the process concerning the "unnoticed communication" is performed at step S139 (when the "unnoticed communication" is not being performed at this time point, the process at step S139 may be skipped). Then, the processing returns to step S131, and the same process is repeated.

On the other hand, as a result of the determination at step S137, when the value of the fourth stop counter 512 is not equal to or higher than 1, namely, is 0 (NO at step S137), the process concerning the "unnoticed communication" is performed. In this case, first, at step S140, it is determined whether or not the infrastructure communication program 5024 is stored in the RAM 362 of the wireless communication module 36 (e.g., when the value of the third stop counter 511 is equal to or higher than 1 and the value of the fourth stop counter 512 is 0, the infrastructure communication program 5024 remains stored in the RAM 362 of the wireless communication module 36). As a result, when the infrastructure communication program 5024 is not stored in the RAM 362 (NO at step S140), the infrastructure communication program 5024 is copied into the RAM 362 of the wireless communication module 36 at step S141. The infrastructure communication program 5024 is a program for the wireless communication module 36 to implement the infrastructure communication function, and is, for example, a program for communicating with an AP or a server on the basis of the TCP/IP protocol. Since a basic control method and the like in the program has been already known to one skilled in the art, the detailed description thereof is omitted. On the other hand, when the infrastructure communication program 5024 has been already stored in the RAM 362 (YES at step S140), the process at step S141 is skipped.

Next, at step S142, a process of searching for an AP is performed. In this process, a process of searching for an AP is performed in cooperation with the infrastructure communication program 5024 executed in the wireless communication module 36. This search process can be performed as a more complicated process than the simple search process for AP performed in the "sleep mode" (step S22 in FIG. 16). Specifically, in addition to passive scan, so-called active scan is also used as appropriate. This is for also enabling a connection to an AP, for example, using an SSID stealth function. It is not necessarily necessary to use active scan in combination, and only passive scan may be used.

Next, at step S143, it is determined whether or not an AP is detected as a result of the search. As a result, when no AP is detected (NO at step S143), the processing returns to step S131, and the same process is repeated. On the other hand, when an AP is detected (YES at step S143), a process of establishing a connection to the AP is performed at step S144.

Next, at step S145, the "unnoticed communication" process is performed. This process will be described in detail below.

When the "unnoticed communication" process ends, it is determined at step S146 whether or not a state of being communicable with the AP connected at step S144 continues. For example, it can be determined whether or not the communicable state continues, by periodically detecting a beacon transmitted from the connected AP (even after the connection is established) or the like. By so doing, for example, it can be determined whether or not the game apparatus 10 has moved out of the communicable range of the AP. As a result, when the communicable state continues (YES at step S146), it is determined at the subsequent step S147 whether or not the value of the fourth stop counter 512 is equal to or higher than 1. As a result, when the value is not equal to or higher than 1 (NO at step S147), the processing returns to step S145, and the same process is repeated. In other words, the connection to the AP continues to be maintained. On the other hand, when the value is equal to or higher than 1 (YES at step S147), the processing returns to step S131, and the same process is repeated. As a result, (unless a stop instruction has been issued), the process concerning the "passing communication" is performed (in the wireless communication module 36). There is the possibility that an instruction to stop the "unnoticed communication" is issued from an application even when the connection to the AP is maintained. This determination is performed for reflecting the instruction. This is the end of the description of the normal time BG communication process.

(Unnoticed Communication Process)

Figure 23:
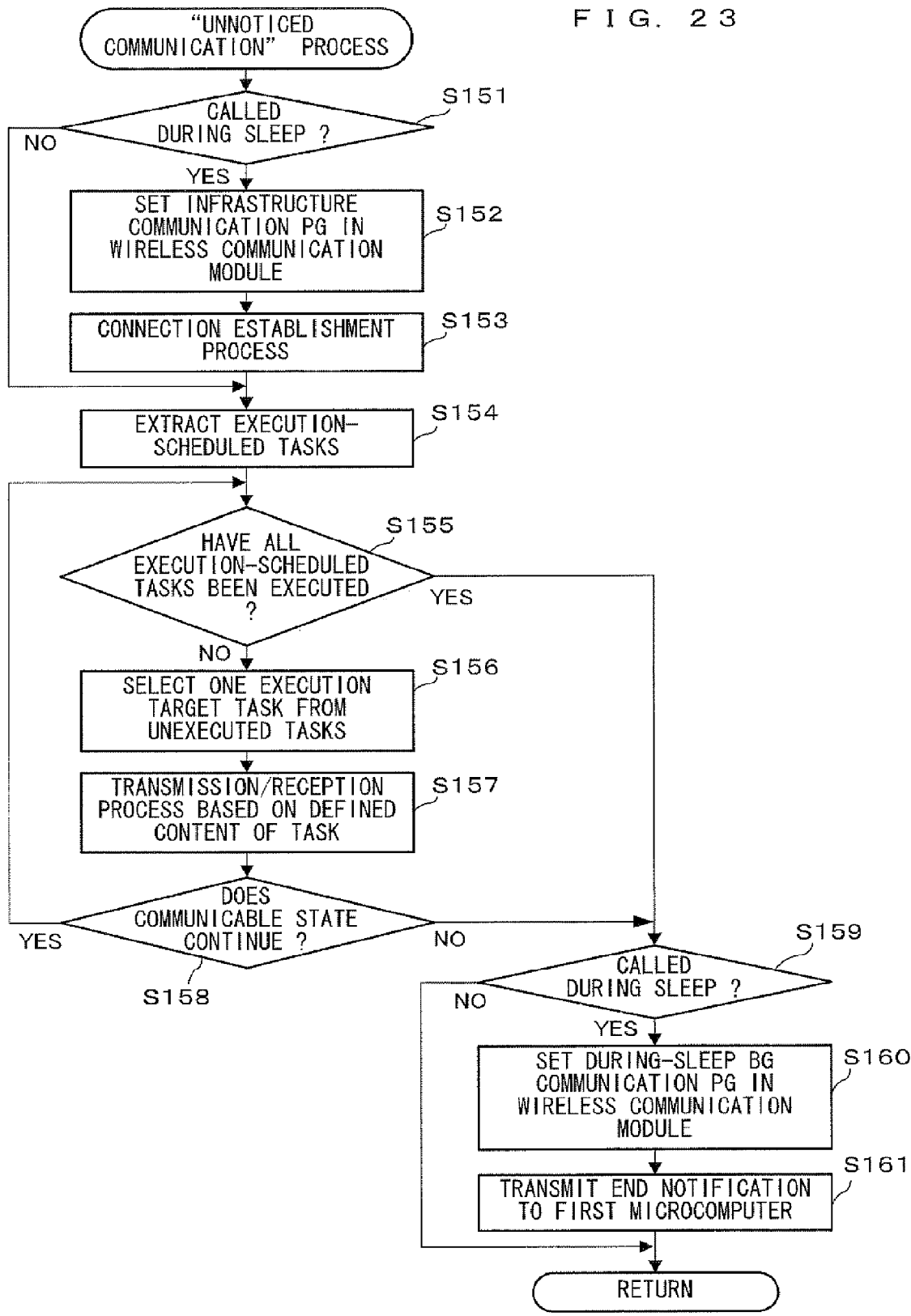
FIG. 23 is a flowchart illustrating details of an "unnoticed communication" process.

Next, the "unnoticed communication" process at step S141 will be described in detail. FIG. 23 is a flowchart illustrating details of the "unnoticed communication" process. First, at step S151, it is determined whether or not this process has been called in the "sleep mode". In other words, it is determined whether or not this process is performed in accordance with the process at step S4 in the microcomputer process. As a result of the determination, when this process has been called in the "sleep mode" (YES at step S151), the infrastructure communication program 5024 is copied into the RAM 362 of the wireless communication module 36 at step S152. As a result, the wireless communication module 36 becomes a state of enabling the infrastructure communication function to be implemented. Next, at step S153, a process of establishing a connection to an AP detected in the "sleep mode" (the AP detected as a result of step S22 in FIG. 16) is performed. Then, the processing proceeds to below-described step S154.

On the other hand, as a result of the determination at step S151, when this process has not been called in the "sleep mode" (NO at step S151), it means that this process has been called in the "normal power mode", and thus the processes at steps S152 and S153 are skipped.

Next, at step S154, the "unnoticed communication" data 506 is referred to, and tasks scheduled to be executed at this time point (including tasks of which the scheduled execution times have been passed and that have not been executed) are extracted. Next, at step S155, it is determined whether or not the following process has been performed for all the extracted tasks scheduled to be executed. As a result, when any unexecuted tasks remain (NO at step S155), one task is selected as an execution target task from the unexecuted tasks at the next step S156.

Next, at step S157, the task content definition data 5062 of the execution target task is referred to, and transmission/reception of data and the like are performed with a predetermined server on the basis of the defined content.

Next, at step S158, it is determined whether or not the state of being communicable with the AP continues (whether or not the game apparatus 10 has moved out of the communicable range of the AP). As a result, when the communicable state continues (YES at step S158), the processing returns to step S155, and the same process is repeated.

On the other hand, when it is determined at step S158 that the communicable state does not continue (NO at step S158), or when it is determined at step S155 that all the tasks scheduled to be executed have been executed (YES at step S155), it is determined at step S159 whether or not this process has been called in the "sleep mode", similarly to step S151. As a result, when this process has been called in the "sleep mode" (YES at step S159), a process for returning to the "sleep mode" again is performed. First, at step S160, the during-sleep BG communication process program 5021 is copied into the RAM 362 of the wireless communication module 36. By so doing, the wireless communication module 36 becomes a state of being capable of performing the during-sleep BG communication process shown in FIG. 16. Next, at step S161, a notification that the unnoticed communication has ended is transmitted to the first microcomputer 37. As a result, an instruction to shift to the "sleep mode" is issued from the first microcomputer 37 to the CPU 311 (the process at step S6 in FIG. 15).

On the other hand, as a result of the determination at step S159, when this process has not been called in the "sleep mode" (NO at step S159), it means that this process has been called in the "normal power mode", and thus the processes at steps S160 and S161 are skipped and the "unnoticed communication" process ends.

As described above, in the present embodiment, the two types of searches, the search for the "passing communication" and the search for the "unnoticed communication", are repeatedly performed as background processes. Then, the "passing communication" is performed when another game apparatus 10 is detected in the search for the "passing communication", and the "unnoticed communication" is automatically performed when an AP is detected in the search for the "unnoticed communication". Further, the two types of searches are automatically and alternately performed in predetermined cycles. By so doing, the two types of communications are automatically performed, and communications having various contents can be performed without making the user aware of it. In addition, two types of communications, communication with a terminal at a close place and communication with a connection target at a distant place (in a sense of network) such as a server, can be performed seamlessly. Moreover, since the search for the "passing communication" and the search for the "unnoticed communication" are alternately performed, both communications can be performed averagely (evenly) to some extent. For example, when the number of other game apparatuses 10 is much larger than the number of APs in an event site, the "passing communication" can be prevented from being performed very often, and the "unnoticed communication" can be performed often to some extent.

With regard to the search pattern, in the embodiment described above, in the "sleep mode", the search period of 30 seconds is provided for the "passing communication", and then the search for the "unnoticed communication" is performed once. In other words, setting is made such that the "passing communication" is more likely to occur. Meanwhile, in the "normal power mode", control is performed such that when the game apparatus 10 is connected to an AP, the state of being connected to the AP is maintained until communication with the AP becomes disenabled, and the "passing communication" is not performed during the period. In other words, in the "sleep mode", occurrence of the "passing communication" is prioritized, and in the "normal power mode", occurrence of the "unnoticed communication" (further, various communication processes using infrastructure communication) is prioritized. Thus, communication more suitable for the used state of the game apparatus 10 can be easily performed.

In the "normal power mode", it is possible to issue an instruction to stop the search process for the "passing communication" or the "unnoticed communication", from an application. Thus, the background communication can be stopped in accordance with an instruction from an application, and an appropriate communication process can be performed in accordance with the process content of an application to be executed. In addition, the processing load at execution of an application can be reduced, and a more flexible environment for developing an application can be provided to a developer. Further, the number of applications issuing stop instructions is counted by using the game apparatus counter 510. Thus, for example, even when stop instructions are issued from three applications and then any one of the applications cancels the stop instruction, stop of communication can be prevented from being cancelled immediately. In other words, control can be performed such that a stop instruction from an application is preferentially reflected.

With regard to the "passing communication" described above, in the embodiment described above, the "passing communication" may occur a plurality of times during 30 seconds (during the first allocation period). In another embodiment, when the "passing communication" is performed and completed once during 30 seconds, even if 30 seconds has not elapsed, the "passing communication" process may be ended to shift to the search for the "unnoticed communication". Specifically, when the process at step S45 or S50 in FIG. 17 is performed, the "passing communication" process may end subsequently.

In the embodiment described above, the search pattern is repeated in which the search for the "passing communication" is performed for 30 seconds and then the search for the "unnoticed communication" is performed once. The search pattern (the condition of switching the two types of searches) may be changeable. For example, data that defines the search pattern may be prepared in a predetermined server. Then, the data that defines the search pattern may be received from the server by using the "unnoticed communication", and the search pattern may be changed in the game apparatus 10 in accordance with a content of the data.

In the embodiment described above, the search for the "passing communication" and the search for the "unnoticed communication" are alternately performed. At this time, control may be performed such that when a connection target detected in the search is the same as a target connected at the last time, the game apparatus 10 does not connect to this target. For example, it is assumed that the "unnoticed communication" is performed and then the "passing communication" is performed. Then, when an AP detected as a result of the search for the "unnoticed communication" is the same as an AP connected just before, another AP may not be searched for, the "unnoticed communication" process may not be performed, and the search for the "passing communication" may be performed immediately.

With regard to the search process, in the embodiment described above, the pattern has been described in which the search for the "passing communication" and the search for the "unnoticed communication" are alternately performed. However, the present invention is not limited thereto, and the search for the "passing communication" and the search for the "unnoticed communication" may be performed together in one search. For example, an operation having the "master mode" and so-called passive scan may be performed. In other words, in a search operation in which the game apparatus 10 waits for a beacon, the game apparatus 10 is configured to receive a beacon for the "passing communication" and a beacon transmitted from an AP. Then, it may be determined whether a received beacon is a beacon for the "passing communication" or a beacon transmitted from an AP, and the "passing communication" process or the "unnoticed communication" process may be selected and performed as appropriate in accordance with the result of the determination. In other words, the search for the "passing communication" and the search for the "unnoticed communication" are not separated from each other, and the content of a communication process to be performed may be changed as appropriate in accordance with the type of a received beacon.

In the case where the content of the communication process to be performed is changed as appropriate in accordance with the type of a received beacon as described above, for example, communication processes corresponding to types of beacons that received during a given period may be performed in order by using a concept of queue. For example, it is assumed that three beacons are received in one search, two of the beacons are beacons for the "passing communication" and the rest is a beacon from an AP. In this case, the "passing communication", and the "unnoticed communication" may be performed in order of reception of the beacons. For example, as a result of one search, three communication processes may be performed in order of "passing communication"→"passing communication"→ "unnoticed communication". Other than the order of reception of the beacons, the execution order may be determined in accordance with a priority. For example, when control is desired to be performed such that the "passing communication" is preferentially performed, a priority is set such that the "unnoticed communication" is performed after the "passing communication" is preferentially performed. When control is desired to be performed such that the "unnoticed communication" is preferentially performed, a priority is set such that the "passing communication" is performed after the "unnoticed communication" is performed. When control is desired to be performed such that the "passing communication" and the "unnoticed communication" are alternately performed, a priority may be set such that the "passing communication" and the "unnoticed communication" are alternately performed.

With regard to transmission/reception of data performed in the "passing communication", the infrastructure communication may be further used. In other words, when another game apparatus 10 is present nearby, the "passing communication" may be performed as described above, and when another game apparatus 10 is not present nearby and it is in a situation where the infrastructure communication is possible, transmission/reception of the "passing communication" data 505 may be performed with another game apparatus 10 in the same situation by using the infrastructure communication. For example, transmission/reception of the "passing communication" data 505 may be performed between game apparatuses that are located in the same region. In other words, game apparatuses 10 that are located at positions close to each other to some extent may perform a process similar to the "passing communication" described above, by using the infrastructure communication, thereby complementing the "passing communication". This is useful for a situation where there are a small number of other users having game apparatuses 10 near the user due to a regional circumstance or the like. In addition, when an AP is present in the communicable range of the game apparatus 10 in the "normal power mode", a connection to the AP is maintained and the search for the "passing communication" cannot be performed. Thus, this configuration is also useful for preventing the passing communication from being performed in such a situation.

With regard to the instruction to stop the background communication which instruction is issued from an application, in the embodiment described above, when a stop instruction is issued from any one application, the background communication is stopped in accordance with the instruction. In another embodiment, the background communication may be stopped when the number of applications issuing instructions to stop the background communication, among applications being executed, is equal to or higher than a predetermined number, or it may be determined whether or not to stop the background communication, by majority vote.

With regard to the application counter 507, in the embodiment described above, a stop instruction can be issued by each program constituting an application. Thus, the value of each counter included in the application counter 507 is 2 or more in some cases. However, the present invention is not limited thereto, and, for example, a flag indicating whether or not a stop instruction has been issued may be used. In other words, a flag may be used which indicates that "there is a stop instruction" when even one of programs constituting an application has issued a stop instruction, and which indicates that "there is no stop instruction" when no stop instruction has been issued.

In the embodiment described above, the hand-held game apparatus has been described as an example of the information processing apparatus. However, the present invention is also applicable to and particularly useful for small-size portable information terminals such as mobile phones and PDAs. In addition, the present invention is also applicable to portable information processing terminals that are not so small but can be carried in a bag or the like, such as tablet type information terminals (tablet terminals and tablet PCs), slate PCs, and notebook computers.

In the embodiment described above, a series of processes concerning an instruction from an application to stop the background communication is performed in a single apparatus (the game apparatus 10). In another embodiment, the series of processes may be performed in an information processing system that includes a plurality of information processing apparatuses. For example, in an information processing system that includes a terminal side apparatus and a server side apparatus communicable with the terminal side apparatus via a network, a part of the series of processes may be performed by the server side apparatus. Alternatively, in an information processing system that includes a terminal side apparatus and a server side apparatus communicable with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While the technology presented herein has been described in detail, the foregoing description is in all aspects illustrative and not restrictive. It will be understood that numerous other modifications and variations can be devised without departing from the scope of the technology presented herein.

What is claimed is:

1. An information processing apparatus comprising:
a wireless communication module; and
a computer processor configured to perform at least:
search for another information processing apparatus and an access point by using short-distance wireless communication;
first communication process for performing data communication with the other information processing apparatus found by the search;
second communication process for performing data communication via the access point found by the search;
determining whether or not a result of the search is the other information processing apparatus or the access point; and
communication process control for switching a communication process to be performed between the first communication process and the second communication process, in accordance with a result of the determination by the search.

2. The information processing apparatus according to claim 1, wherein the search comprises:
   search switch for switching between a first search and a second search;
   first search for performing a search for the other information processing apparatus when the search switch switches to the first search; and
   a second search for performing a search for the access point when the search switch switches to the second search.

3. The information processing apparatus according to claim 2, wherein
   the search switch switches between the first search and the second search each time a predetermined time elapses.

4. The information processing apparatus according to claim 3, wherein
   the predetermined time is a first unit time after the search switch switches to the first search, and is a second unit time shorter than the first unit time after the search switch switches to the second search.

5. The information processing apparatus according to claim 2, the computer processor further configured to perform a use state change for changing a state of the information processing apparatus between an unused state and a used state, wherein
   the second communication process comprises a connection for connecting to the access point when it is determined that the access point is found, and
   the connection:
   cuts a connection to the access point after data communication via the access point ends, when the information processing apparatus is in the unused state; and
   maintains the connection to the access point even after the data communication via the access point ends, when the information processing apparatus is in the used state.

6. The information processing apparatus according to claim 5, wherein,
   in the unused state of the information processing apparatus, the search switch switches to the first search when the connection to the access point is cut by the connection.

7. The information processing apparatus according to claim 6, wherein,
   in the used state of the information processing apparatus, the search switch switches to the first search when communication with the access point becomes disenabled after the information processing apparatus is connected to the access point by the connection.

8. The information processing apparatus according to claim 5, wherein,
   when the state of the information processing apparatus is changed from the used state to the unused state, even if the data communication is performed by the first communication process or the second communication process, the connection stops the data communication and starts the first search and the second search in the unused state.

9. The information processing apparatus according to claim 2, wherein
   the first search repeatedly transmits a first search signal for searching for the other information processing apparatus and attempts to receive the first search signal repeatedly transmitted from the other information processing apparatus, and
   the second search attempts to receive a second search signal repeatedly transmitted from the access point.

10. The information processing apparatus according to claim 2, the computer processor further configured to perform switch condition update for updating a switch condition for the switching by the search switch, wherein
    the search switch switches between the first search and the second search on the basis of the switch condition updated by the switch condition update.

11. The information processing apparatus according to claim 10, the computer processor further configured to perform switch condition reception for receiving the switch condition from a server, wherein
    the switch condition update updates the switch condition to the switch condition received by the switch condition reception.

12. The information processing apparatus according to claim 1, wherein
    the first communication process connects directly to another information processing apparatus present in a range of short-distance wireless communication, by using the short-distance wireless communication, and performs data communication with the other information processing apparatus, and
    the second communication process connects to a network via the access point, and performs data communication with a server or another information processing apparatus via the network.

13. The information processing apparatus according to claim 1, wherein
    the information processing apparatus is a portable information processing apparatus.

14. A non-transitory computer-readable storage medium having stored therein an information processing program executed by a computer of an information processing apparatus, the information processing program causing the computer to perform:
    search for another information processing apparatus and an access point, via a wireless communication module of the information processing apparatus;
    first communication process for performing data communication with the other information processing apparatus found by the search; and
    second communication process for performing data communication via the access point found by the search;
    determining whether or not a result of the search is the other information processing apparatus or the access point; and
    switching a communication process to be performed between the first communication process and the second communication process, in accordance with a result of the determination by the search.

15. An information processing method for controlling an information processing apparatus comprising a computer processor and a wireless communication module, the information processing method comprising the computer processor at least:
    performing a search for another information processing apparatus and an access point via the wireless communication module;
    performing a first communication process including data communication with the other information processing apparatus found at the search;

performing a second communication including data communication via the access point found at the search;
determining whether or not a result of the search is the other information processing apparatus or the access point; and
switching a communication process to be performed between the first communication process and the second communication process, in accordance with a result of the determination by the search.

16. An information processing system comprising a server and an information processing apparatus,
the server comprising a communication module configured to perform data communication with the information processing apparatus via a network,
the information processing apparatus comprising:
a wireless communication module; and
a computer processor configured to perform at least:
search for another information processing apparatus and an access point by using short-distance wireless communication, via the wireless communication module;
first communication process for connecting directly to the other information processing apparatus found by the search, and performing data communication with the other information processing apparatus;
second communication process for performing data communication with the server via the access point found by the search;
determining whether or not a result of the search is the other information processing apparatus or the access point; and
communication process control for switching a communication process to be performed between the first communication process and the second communication process, in accordance with a result of the determination by the search.

17. An information processing apparatus comprising:
a processing system, comprising
a wireless communication module; and one or more processors, the processing system being configured to:
perform a search for another information processing apparatus and an access point by using short-distance wireless communication via the wireless communication module;
perform data communication, without using the Internet, directly with the other information processing apparatus found by the search;
perform data communication, using the Internet, via the access point found by the search;
determine whether or not a result of the search is the other information processing apparatus or the access point; and
switch between a data communication, without using the Internet, directly with the other information processing apparatus and a data communication, using the Internet, via the access point, in accordance with a result of the determination.

18. The information processing apparatus according to claim 17, wherein the search comprises:
switching between a first search and a second search;
performing a search for the other information processing apparatus when the search switches to the first search; and
performing a search for the access point when the search switches to the second search.

19. The information processing apparatus according to claim 17, wherein
the processing system is configured to perform the search such that a ratio of performing a search for the access point is higher than a ratio of performing a search for the other information processing apparatus.

20. The information processing apparatus according to claim 17, wherein
the information processing apparatus connects directly to another information processing apparatus present in a range of short-distance wireless communication, by using the short-distance wireless communication, and performs data communication with the other information processing apparatus, and
the information processing apparatus connects to a network via the access point, and performs data communication with a server or another information processing apparatus via the network.

\* \* \* \* \*